(12) United States Patent
Mittal et al.

(10) Patent No.: US 11,942,656 B2
(45) Date of Patent: Mar. 26, 2024

(54) BATTERY SEPARATORS, BATTERIES AND RELATED METHODS

(71) Applicant: Daramic, LLC, Charlotte, NC (US)

(72) Inventors: Surendra K. Mittal, Bangalore (IN); Jeffrey K. Chambers, Philpot, KY (US); Jörg Deiters, Ettenheim (DE)

(73) Assignee: Daramic, LLC, Charlotte, NC (US)

( * ) Notice: Subject to any disclaimer, the term of this patent is extended or adjusted under 35 U.S.C. 154(b) by 213 days.

(21) Appl. No.: 14/933,062

(22) Filed: Nov. 5, 2015

(65) Prior Publication Data
US 2016/0126522 A1 May 5, 2016

Related U.S. Application Data

(63) and a continuation of application No. PCT/US2014/064033, filed on Nov. 5, 2014.
(Continued)

(51) Int. Cl.
*H01M 2/16* (2006.01)
*H01M 2/18* (2006.01)
(Continued)

(52) U.S. Cl.
CPC ....... *H01M 50/463* (2021.01); *H01M 50/417* (2021.01); *H01M 50/449* (2021.01);
(Continued)

(58) Field of Classification Search
None
See application file for complete search history.

(56) References Cited

U.S. PATENT DOCUMENTS 3,933,525 A * 1/1976 Palmer ............... D04H 3/16
429/246
4,440,838 A * 4/1984 Schmidt ............. H01M 2/162
429/250
(Continued)

FOREIGN PATENT DOCUMENTS

WO  WO 2010-058240 A1  5/2010
WO  WO 2010-072233 A1  7/2010

*Primary Examiner* — Zhongqing Wei
(74) *Attorney, Agent, or Firm* — Hammer & Associates, P.C.

(57) ABSTRACT

New, improved or optimized battery separators, components, batteries, industrial batteries, inverter batteries, batteries for heavy or light industrial applications, forklift batteries, float charged batteries, inverters, accumulators, systems, methods, profiles, additives, compositions, composites, mixes, coatings, and/or related methods of water retention, water loss prevention, improved charge acceptance, production, use, and/or combinations thereof are provided or disclosed. More particularly, the present invention is directed to one or more improved battery separators having various improvements that may result in decreased water loss for a battery in which such a separator is incorporated, enhanced charge acceptance, or combinations thereof. Additionally, the present invention relates to one or more improved battery separators having various improvements with regard to shape, and/or physical profile, and/or chemical(s), additives, mixes, coatings, and/or the like used to make such battery separators (such as oil(s), and/or chemical additive(s) or agents used to coat, finish or improve such battery separators (such as surfactant(s))). The improved battery separators of the instant invention are particularly useful in or with industrial batteries, such as inverter batteries, batteries for heavy or light duty industrial applications, and so forth.

23 Claims, 26 Drawing Sheets

Related U.S. Application Data

(60) Provisional application No. 62/075,960, filed on Nov. 6, 2014.

(51) Int. Cl.
| | | |
|---|---|---|
| *H01M 10/04* | (2006.01) | |
| *H01M 10/12* | (2006.01) | |
| *H01M 50/417* | (2021.01) | |
| *H01M 50/449* | (2021.01) | |
| *H01M 50/451* | (2021.01) | |
| *H01M 50/463* | (2021.01) | |
| *H01M 50/466* | (2021.01) | |
| *H01M 50/469* | (2021.01) | |
| *H01M 50/489* | (2021.01) | |

(52) U.S. Cl.
CPC ....... *H01M 50/451* (2021.01); *H01M 50/466* (2021.01); *H01M 50/469* (2021.01); *H01M 10/12* (2013.01); *H01M 50/489* (2021.01); *H01M 2220/20* (2013.01); *Y02E 60/10* (2013.01)

(56) References Cited

U.S. PATENT DOCUMENTS

| | | |
|---|---|---|
| 5,246,798 A | 9/1993 | Yacoub |
| 7,094,498 B2 | 8/2006 | Miller et al. |
| 10,119,025 B2 | 11/2018 | Whear et al. |
| 2011/0091761 A1* | 4/2011 | Miller ............... H01M 50/463 429/143 |
| 2012/0070747 A1* | 3/2012 | Whear ............... H01M 2/18 429/247 |

\* cited by examiner

BATTERY SEPARATORS, BATTERIES AND RELATED METHODS

RELATED APPLICATIONS

This application claims priority to and the benefit of co-pending International patent application No. PCT/US2014/064033 filed Nov. 5, 2014, and U.S. Provisional Application No. 62/075,960 filed Nov. 6, 2014, each incorporated herein by reference in its entirety.

FIELD OF THE INVENTION

The instant disclosure is directed to new, improved or optimized battery separators, components, batteries, industrial batteries, inverter batteries, batteries for heavy or light industrial applications, forklift batteries, float charged batteries, inverters, accumulators, systems, methods, profiles, additives, compositions, composites, mixes, coatings, and/or related methods of water retention, water loss prevention, improved charge acceptance, production, use, and/or combinations thereof. More particularly, the present invention is directed to one or more improved battery separators having various improvements that may result in decreased water loss for a battery in which such a separator is incorporated, enhanced charge acceptance, or combinations thereof. Additionally, the present invention relates to one or more improved battery separators having various improvements with regard to shape, and/or physical profile, and/or chemical(s), additives, mixes, coatings, and/or the like used to make such battery separators (such as oil(s), and/or chemical additive(s) or agents used to coat, finish or improve such battery separators (such as surfactant(s))). The improved battery separators of the instant invention are particularly useful in or with industrial batteries, such as inverter batteries, batteries for heavy or light industry, and so forth.

BACKGROUND OF THE INVENTION

Various batteries are used in industrial settings and/or settings in which deep discharge is desirable. Such batteries may include, but are not limited to, for example, lead acid batteries, inverter batteries, solar batteries, golf cart batteries, batteries for equipment (such as a floor scrubber or the like), batteries for a forklift or other equipment, submarine batteries, tubular inverter batteries, flat plate inverter batteries, and/or flooded inverter batteries. As is known, discharging deeply means that the battery must provide a lot of energy over a long period of time; therefore, such batteries may begin with a relatively high capacity for energy storage and loose some of its capacity in service over a period of time. Such deep discharge may mean that it may take a relatively long amount of time to fully re-charge such a battery to its full capacity. Thus, improving re-chargeability of such a battery may be important, and obtaining a battery with an improved state of charge or higher partial state of charge may also be important in the battery industry.

For at least certain applications, and charge/discharge cycling applications in particular, it is desirable to provide battery separators for industrial batteries that differentiate from previously known battery separators. A battery separator is a component that divides, or "separates", the positive electrode from the negative electrode within a battery cell. A battery separator may have two primary functions. First, a battery separator should keep the positive electrode physically apart from the negative electrode in order to prevent any electronic current passing between the two electrodes. Second, a battery separator should permit an ionic current between the positive and negative electrodes with the least possible resistance. A battery separator may be made out of many different materials, but these two opposing functions have been met well by a battery separator being made of a porous nonconductor.

Improving the re-chargeability of industrial batteries (such as, for example, inverter batteries) is desired. As is known, an inverter turns DC into AC and may be helpful in a wide variety of settings, such as areas where a power grid is unstable or has been deteriorated. Batteries such as inverter batteries operate primarily under a partial state of charge. Constantly operating in a partial state of charge may mean that corrosion occurs, and/or battery life is compromised, and/or negative plate sulphation may become a limiting factor in the performance and life of such batteries. Enhancing the re-chargeability of the battery as well as lowering the amount of water loss encountered by the battery are desirable.

Some previously known battery separators, despite having improved features, have not been able to improve the charge acceptance, and therefore, re-chargeability, of the industrial batteries in which they are placed. Thus, a need exists for an improved battery separator for an industrial battery that provides various improvements over known separators. An improved battery separator that meets such needs may result in improvements in battery characteristics, such as improved charge acceptance of the battery, improved re-chargeability of the battery, reduced water loss of the battery, improved charge/discharge cycling efficiency of the battery, and/or extended life of the battery.

SUMMARY OF THE INVENTION

In accordance with at least selected embodiments, the instant invention may address one or more of the above mentioned desires, needs, issues, and/or problems and provides new, improved or optimized battery separators and methods relating to batteries, including, but not limited to, industrial batteries. In at least select embodiments, the battery separator may have an improved physical shape and/or profile and may include an optimized amount of one or more chemical additives, such as one or more surfactants, to provide the improved battery separator with improved properties. Additionally, the present invention relates to one or more improved battery separators having various improvements with regard to shape, and/or physical profile, and/or chemical(s) used to make such battery separators (such as oil), and/or chemical additive(s) used to coat, finish or improve such battery separators (such as surfactants). The improved battery separators and methods of the present invention may result in improved battery properties for batteries into which such separators are incorporated. Such improved properties include, but are not limited to, increased charge acceptance for the battery in which the separator is used and increased re-chargeability for such battery as well as decreased water loss for such a battery. The improved battery separators of the instant invention are particularly useful with industrial batteries, such as inverter batteries, batteries for heavy or light duty industrial applications, and so forth.

In accordance with at least selected embodiments, aspects, or objects, the present invention may address the limitations of the prior art and is directed to new, improved or optimized battery separators, components, batteries, industrial batteries, inverter batteries, batteries for heavy or light industrial applications, forklift batteries, float charged batteries, inverters, accumulators, systems, methods, profiles, additives, compositions, composites, mixes, coatings, and/or related methods of water retention, water loss prevention, improved charge acceptance, production, use, and/or combinations thereof. More particularly, the present invention is directed to one or more improved battery separators having various improvements that may result in decreased water loss for a battery in which such a separator is incorporated, enhanced charge acceptance, or combinations thereof. Additionally, the present invention relates to one or more improved battery separators having various improvements with regard to shape, and/or physical profile, and/or chemical(s), additives, mixes, coatings, and/or the like used to make such battery separators (such as oil(s), and/or chemical additive(s) or agents used to coat, finish or improve such battery separators (such as surfactant(s))). The improved battery separators of the instant invention are particularly useful in or with industrial batteries, such as inverter batteries, batteries for heavy or light duty industrial applications, and so forth.

BRIEF DESCRIPTION OF THE DRAWINGS

For the purpose of illustrating the instant invention, there is shown in the drawings a form that is presently preferred; it being understood, however, that this invention is not limited to the precise arrangements and instrumentalities shown.

FIG. 3(a), a top view of the positive side of such battery separator (the side that faces the cathode of a battery); FIG. 3(b) a cross-sectional view of the battery separator viewed along the machine direction or the height of the separator; FIG. 3(c), an edge view of the battery separator viewed along the cross direction or the width of the separator (specifically, viewed along the arrow at the left of FIG. 3(a)); and FIG. 3(d), an enlarged cross-section view of the circled portion of FIG. 3(b) to better show the improved profile of the separator.

DETAILED DESCRIPTION OF THE INVENTION

Figure 1:
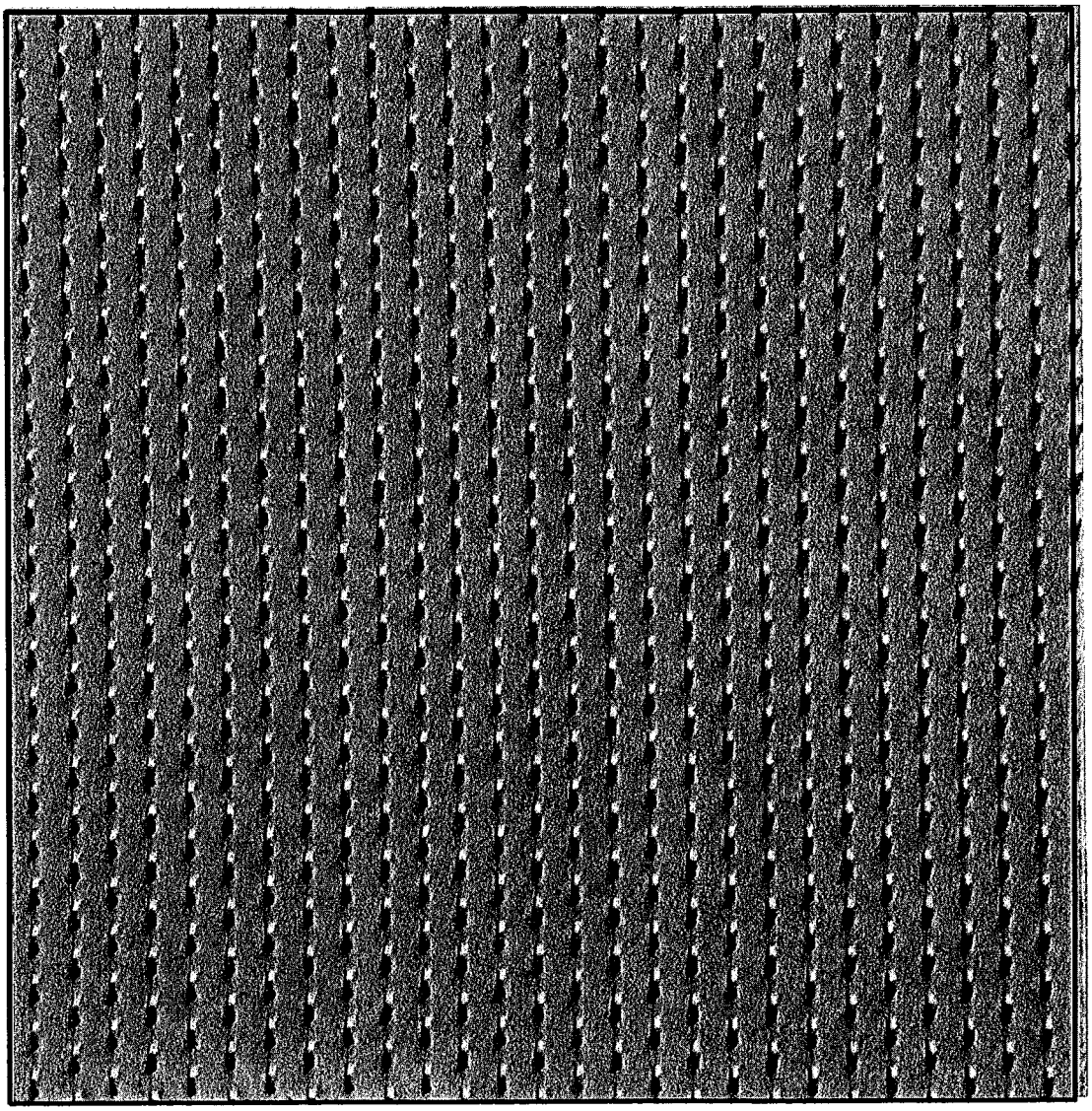
FIG. 1 is a photographic image of a battery separator according to one embodiment of the present invention, wherein the separator is a polyethylene separator with an improved physical profile, and the photograph shows the positive side of such separator, which side faces the cathode of a battery.

In accordance with at least certain embodiments, the present invention provides an improved battery separator that has an improved physical profile and/or shape and/or contains one or more chemical additives, such as one or more surfactants, to provide unexpected improvements to a battery in which such a separator is used. Additionally, the present invention relates to one or more improved battery separators, and related methods, which separators have various improvements with regard to shape, and/or physical profile, and/or chemical(s) used to make such battery separators (such as oil), and/or chemical additive(s) used to coat, finish or improve such battery separators (such as surfactants).

Deep discharge applications (sometimes called deep cycle applications) often involve the use of deep discharge or deep cycle batteries. Such batteries may include various lead acid batteries, industrial batteries, for example, tubular inverter batteries or other inverter or industrial batteries. Such batteries may be kept on a float charge, meaning that differential electrolyte gravities may develop within the battery cells due to lack of acid mixing and/or acid stratification. Such occurrences may alter and/or even enhance the apparent cell voltage. However, such a phenomenon may result in inhibiting the charge acceptance or re-chargeability of a battery. Furthermore, in past uses of surfactant on battery separators, coating such a surfactant on a battery separator may have succeeded at reducing water loss for the battery and reducing grid corrosion within the battery system, which may offset the effects of impurities on the negative plate or electrode, effectively raising the cell voltage on charge. However, that surfactant coating may reduce further the charge uptake or charge acceptance of the battery. Thus, in some conventional batteries, separators made with an addition of surfactant have seen improvements in lowering water loss with somewhat of a trade-off of a reduction in the charge acceptance/re-chargeability characteristics of the battery.

However, in accordance with the present invention, it has been found that one or more issues relating to re-chargeability (or charge acceptance) of a battery may be addressed by providing a battery separator having not only a particular, optimized, physical profile, sometimes referred to as a serrated profile, but also having an optimized amount of surfactant therein, coated thereon, or both. The so-called serrated profile may allow for better movement of electrolyte within the battery cell and as a result may promote the equalization of the differential gravities of the electrolyte within the system. Such a phenomenon may in turn improve the re-chargeability of a battery under float charge, which may mean that the present improved battery separator may provide both a battery system with improved charge acceptance and improved re-chargeability, particularly when compared to existing and/or previously commercially available separators having different physical profiles and/or different levels of chemical additives (such as surfactants), and with reduced water loss or better water retention characteristics. Having a battery with improved re-chargeability may mean improved batteries (such as inverter batteries) having higher backup time together with low water loss characteristics when compared with conventional batteries. Overall, this may translate into a battery according to embodiments of the present invention having longer battery life, which is highly desirable.

One feature of the battery separator in accordance with at least selected embodiments of the present invention is its improved ability to interact with the antimony (Sb) present in battery systems such as industrial batteries, inverter batteries, tubular inverter batteries, and so forth. Existing levels of Sb in such batteries may vary, for example, from less than about 1% to more than 5% in some applications.

In various battery systems contemplated herein, Sb may be present in one or more plates or electrodes of the battery. For industrial batteries, such as inverter batteries, the battery plates or electrodes may be relatively large because such plates or electrodes may hold a lot of active material to ensure high energy storage capacity that can discharge over time. Such a battery typically is not sealed, and a user adds water to the battery periodically. When such an industrial and/or inverter battery is in use under typical charge/discharge cycling conditions (e.g., partial state of charge conditions), Sb migration from one plate to another may occur, or it may slough off into other parts of the battery cell or system, or it may leach out of a plate. During charge or discharge of the battery, the Sb in the system may affect the over-potential of the battery, which may lead to production of gas (hydrogen, oxygen); the evolution of gas may be well understood as evidenced by numerous commercial battery designs to control gas. As water from the electrolyte decomposes into such gas, water loss occurs. When a battery loses water, it may result in a need to add more water to the battery system to avoid battery failure.

Because water loss is an issue for batteries, it is highly desirable to provide batteries, and battery separators, that combat and/or prevent water loss, thereby increasing the amount of time a battery can be used without adding additional water and avoiding premature battery failure. Not having to stop using a battery for additional watering can mean that the battery (and therefore the equipment it is used in, such as, for example, a forklift) experiences less downtime due to a watering regimen in comparison with frequent stops for watering which may become necessary in the conventional case.

Thus, in at least certain embodiments, the present invention provides, among other things, improved battery separators, batteries, and related methods in which an optimized amount of a chemical additive (such as a surfactant) is coated onto (or added to) a battery separator having an optimized physical profile (such as a serrated profile) such that use of the inventive battery separator in various batteries and methods preferably results in lower water loss for the battery over time as well as increased charge capacity or charge acceptance or re-chargeability for the given battery, which typically operates in a partial state of charge. Such partial state of charge applications may include without limitation various industrial batteries, such as inverter batteries and/or batteries having high Sb content in the electrodes.

The improved battery separators described herein may be made of a polymer, for example, one or more polyolefins, for example, polyethylene, together with one or more fillers, such as silica, and with one or more plasticizers or oils, such as mineral oil (along with other additives or agents, such as one or more surfactants). In some embodiments of the present invention, the battery separator may be made of polyolefin, for example, polyethylene, polypropylene, combinations thereof, and the like. In various embodiments of the present invention, the battery separator may be in the form of sheets, envelopes, or leaves, and may be used with or laminated to another layer comprising, by way of example, a glass layer, a polymer layer (such as polyester), a nonwoven layer, a layer that includes both glass fibers and some polymer fiber, or the like. In such embodiments, the laminate or composite comprising, for example, a polyolefin battery separator and another layer, such as a nonwoven layer, will be coupled with the electrodes of the battery to separate the electrodes from one another. In various embodiments, such as a tubular inverter battery, the battery separator may be provided as a sleeve, which sleeve may be provided over a tube-shaped or rod-shaped electrode using various materials mentioned just above. In other embodiments, an inverter battery could be a flat plate inverter battery, and a battery separator according to the present invention will be generally flat rather than shaped as a sleeve or envelope.

Figure 2:
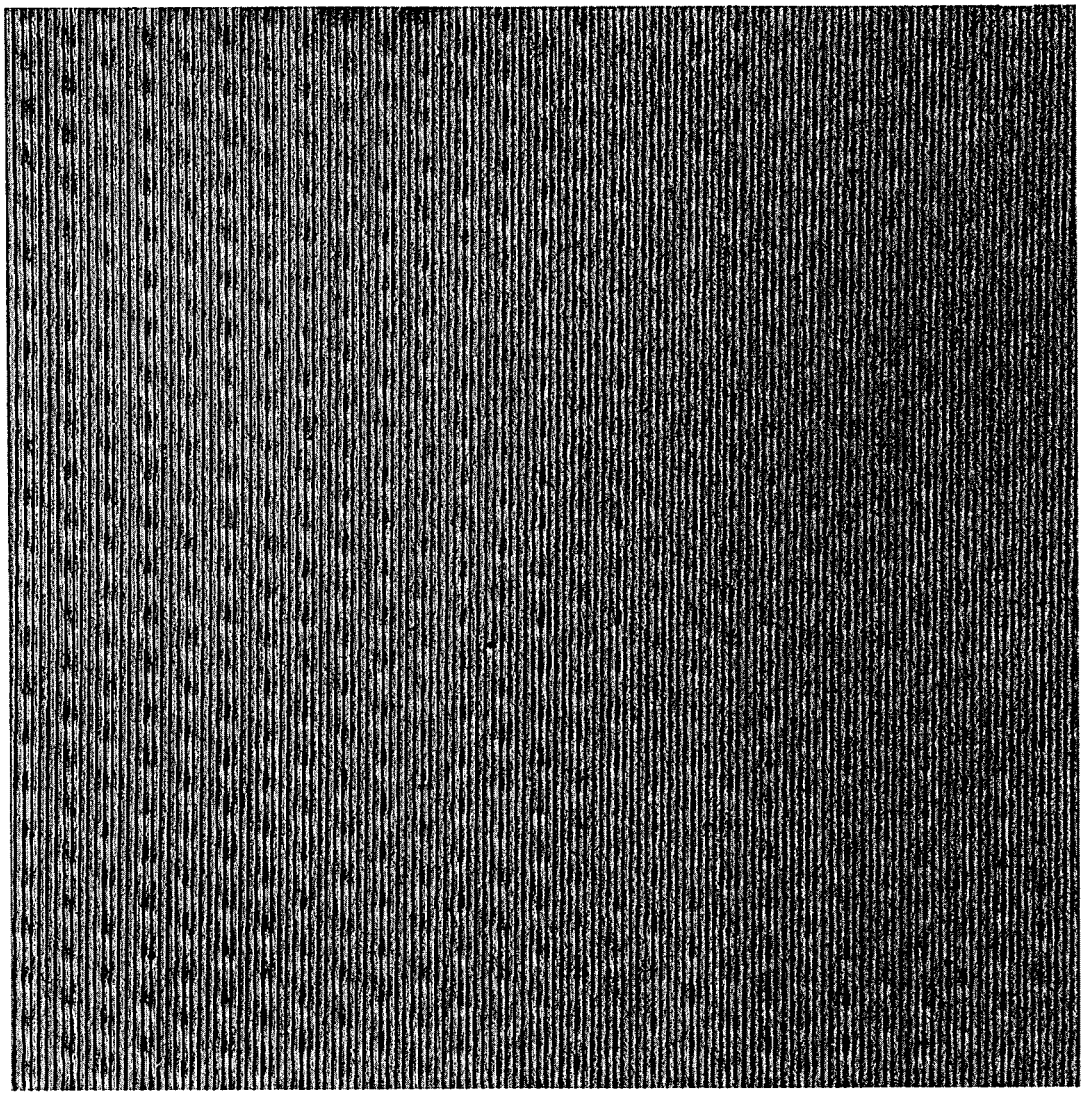
FIG. 2 is a photographic image of a battery separator according to one embodiment of the present invention, wherein the separator is a polyethylene separator with an improved physical profile, and the photograph shows the negative side of such separator, which side faces the anode of a battery.

Regarding the physical profile of the battery separator, in various embodiments of the present invention, the separator includes a backweb, protrusions or nubs extending from the positive side of the backweb, and optionally yet preferably smaller protrusions or mini-ribs extending from the negative side of the backweb. Referring to FIG. 1, it shows a photograph of a positive side of an exemplary battery separator according to one embodiment of the present invention, wherein the separator is polyethylene separator with an improved "serrated" rib profile. FIG. 1 shows the positive side of such separator, the side that typically faces the cathode of the battery. Similarly, FIG. 2 shows the negative side of the polyethylene separator depicted in FIG. 1, and the negative side typically faces the anode of a battery. Although it is preferred that the front and rear ribs and mini-ribs are longitudinal, in one embodiment, the front ribs are longitudinal and the back ribs are transverse mini-ribs (negative cross ribs or NCR). Although not preferred, the back face may also be smooth or ribless.

The improved profile of various separator embodiments according to the present invention can be seen more clearly in FIGS. 3(a) through 3(d). FIG. 3(d) (an enlarged view of the circled portion of FIG. 3(b)) shows backweb 10 as well as protrusions or nubs 12 extending from the positive side of the backweb of the separator and smaller protrusions or mini-ribs 14 extending from the negative side of the backweb of the separator. Additionally, FIG. 3(c) (which is a cross-sectional view of the separator of FIG. 3(a) viewed along the arrow shown at the left of FIG. 3(a)) shows protrusions or nubs 12A (higher rib portions) running longitudinally in a row along the machine direction or height of the separator as well as protrusions or nubs 12B running longitudinally in another row along the machine direction or height of the separator. The peaks of protrusions or nubs 12A and 12B are preferably offset relative to one another. In some instances, this may be referred to as a serrated profile. In some embodiments, the protrusions 12A and 12B may be referred to as nubs, and in some embodiments, battlement nubs. In various possibly preferred embodiments, the protrusions or mini-ribs 14 run transverse, longitudinally, or longitudinally and continuously along the negative side of the backweb without interruption and thus are not serrated in the way that the ribs, protrusions or nubs 12A and 12B are.

Transverse mini-ribs (negative cross ribs or NCR) may be continuous or discontinuous and may enhance the stiffness and/or runnability of thin separators (or separators with thin backwebs) in automated enveloping equipment.

In various embodiments, the thickness of the backweb of the separator (the portion of the separator not including the nubs or ribs on either side) such as backweb 10 may be from about 200 microns to about 500 microns, in some embodiments, about 250 to about 450 microns, and in some embodiments, about 300 to about 450 microns, and in other embodiments, about 300 to about 400 microns. The thickness of the overall battery separator, including the front and rear ribs, may vary. In some embodiments, the overall thickness of such a separator (which thickness includes the backweb and the nubs and ribs on each side) is about 0.5 mm to about 2.5 mm or more, in some embodiments, about 1 mm to about 2 mm, and in some embodiments about 1.1 mm to about 1.9 mm, and in some embodiments, about 1.2 mm to about 1.75 mm, and in other embodiments, about 1.25 mm to about 1.6 mm. In one particular example, the overall thickness is about 1.75 mm, the backweb is about 0.35 mm thick, the positive rib is about 1.28 mm high and the negative rib is about 0.12 mm high. In another particular example, the overall thickness is about 2.00 mm, the backweb is about 0.50 mm thick, the positive rib is about 1.25 mm high and the negative rib is about 0.25 mm high.

Other improved shapes and profiles of the battery separator may be useful in accordance with the present invention. For example, various profiles and shapes of a battery separator are disclosed in U.S. Pat. No. 7,094,498, which is incorporated by reference herein in its entirety.

As noted above, in various embodiments of the present invention, the advantages of the serrated profile described above are combined with the advantages of an optimized amount of a water loss prevention agent, such as one or more surfactants added to (and/or coated onto) the battery separator to provide a battery separator that when used in a battery, provides the battery with an unexpected combination of improved water loss along with improved charged acceptance and/or re-chargeability. The surfactant used in various embodiments of the present invention may be a surfactant having a relatively low HLB value. For example, in certain embodiments herein, the surfactant used has an HLB value of lower than about 6, in some embodiments, lower than about 5, in some embodiments, lower than about 4, and in other embodiments, lower than about 3, in still other embodiments, lower than about 2, and in yet other embodiments, lower than or equal to about 1. As is known in the art, an "HLB" value refers to the hydrophile lipophile balance of the given material. In some embodiments, the additive compound, such as a surfactant, is insoluble or only difficulty soluble in each of water and sulphuric acid. In still other embodiments of the present invention, the surfactant is one that is more hydrophobic in its characteristics than hydrophilic. In other embodiments, the surfactant used herein may be one that is an oil-soluble or organic-soluble surfactant. In other various particular embodiments, the surfactant is one that is not soluble in water, aqueous solution, or sulphuric acid and has an HLB value of from about 1 to about 3. In other embodiments, the surfactant used herein is one that is not soluble or only difficulty soluble in water, aqueous solution, or sulphuric acid and has an HLB value of less than about 6, preferably less than about 5. In other various embodiments of the present invention, the surfactant added to (or coated onto) the battery separator is a surfactant as described in U.S. Patent Publication No. US 2012/0094183, which is incorporated herein by reference in its entirety.

Such a surfactant may be roller coated onto one or both sides of a separator made in accordance with the present invention. Additionally, the surfactant may be applied and/or coated by numerous methods including gravure roller, reverse-gravure, slot-die methods, pneumatic spray methods, dip coating methods, paint brush, sponge application, the like, and so forth. In various embodiments the surfactant is roller coated onto the negative side of the separator (the side of the separator which will face the anode). Additionally, the surfactant may be incorporated into a battery separator by adding it to the beginning of the production process, e.g., by adding it to material to be extruded (e.g., add to the polyolefin in the mixer or extruder).

In embodiments where drying may be required, the method of drying the coated separator may involve many forms of energy to drive off excess water. For example, microwave, forced air ovens, convection ovens, infra-red energy, solvent evaporative drying, azeoptropic drying, the like, etc. The contact time required to dry the separator will vary by method, coating thickness and constitution and separator surface pattern and thermal properties.

Additionally, in various embodiments of the present invention, the add-on level of such a surfactant is higher than has been previously known. For example, an add-on level might be up to about 10 gsm (grams per square meter), in some embodiments, up to about 9 gsm, in other embodiments, up to about 8 gsm, and in some embodiments, an add-on level of about 7.4-7.5 gsm. Such a high add-on level of surfactant combined with an improved or optimized or preferred or selected physical profile (for example, a serrated profile) may result in a battery separator that results in lowered water loss and increased charge acceptance or re-chargeability for the battery in which such a separator is used. Lowering the amount of water loss encountered by a battery is highly desirable, particularly in markets, such as India, where battery water loss may be prevalent.

Using a higher add-on level of surfactant has not been predicted or expected from previously known work with such separators because surfactant can be expensive, it can sometimes be difficult to apply to separators, it can sometimes appear to be "plugging up" a battery separator, and it may reduce charge acceptance and/or lower or slow re-chargeability. However, the combination, as described for one embodiment of the invention herein, of using a particular coating amount (a relatively high coating amount) of a particular surfactant on one side of a particularly shaped battery separator (one having a serrated profile of staggered protrusions or nubs on the positive side and mini-ribs on the negative side) may result in a battery separator having highly surprising and desirable characteristics in that when such separator is used in a battery, the battery experiences a reduction in water loss as well an increase in charge acceptance and/or re-chargeability.

The battery separators described herein may be made in accordance with a known procedure, such as a wet process procedure, which includes adding a polyolefin resin and oil to an extruder, extruding the materials into a precursor, extracting the oil, calendaring the extracted precursor to impart a specific profile or physical shape to the separator (such as a serrated profile), and then rolling and/or slitting and/or forming the separator into an envelope, sleeve or pouch-type shape.

In embodiments where a wet process is used to make the battery separator, another improved battery separator can be provided by optimizing the amount of surfactant added to the battery separator while at the same time optimizing the amount of oil added to the polyolefin resin used to make the battery separator. In such embodiments, a battery separator may be provided that unexpectedly provides a battery into which it is incorporated with improved water loss (meaning a reduction in water loss during use).

While not wishing to be bound by theory, it is believed that the combination of the physical profile and/or shape of the separator described in various embodiments herein and the chemical additive(s) (such as a surfactant) work together to provide a battery separator having unexpectedly enhanced charge acceptance properties, thereby unexpectedly increasing the re-chargeability of a battery in which such a separator is used. All the while, the water loss of a battery is reduced when using a separator according to such embodiments. Combining the characteristics of reducing water loss and improving charge acceptance and/or re-chargeability is highly desirable for a battery such as an industrial battery.

The foregoing battery separator, battery, and related methods shall be further illustrated with regard to the following non-limiting examples.

EXAMPLES

Various battery separators were made according to the embodiments of the present invention.

Example 1

Figure 3:
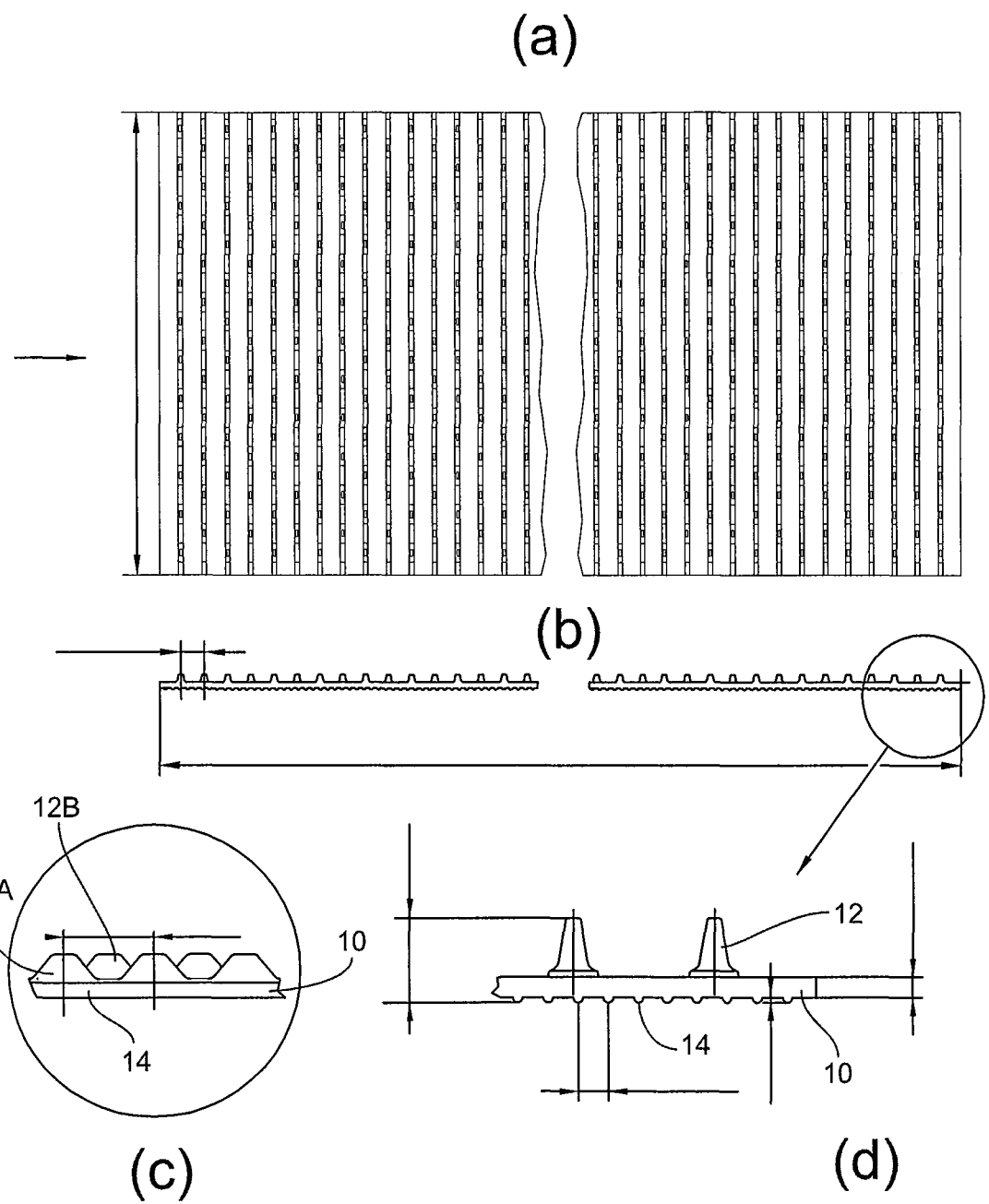
FIG. 3 includes several views of a battery separator according to one embodiment of the present invention, including.

In Example 1, a separator was made having a physical profile in accordance with what is shown in FIG. 3. Photographs of the separator were taken and are shown in FIGS. 1 and 2.

Example 2

In Example 2, several batteries constructed and were tested to determine how well an improved separator according to the present invention functions. The batteries used were tubular flooded inverter batteries, commercially available from Aegan Batteries located in Bangalore, India. The batteries tested were 12V100 Ah at 20 hour. The number of plates per cell was 9 (4 positive and 5 negative). The antimony content in the grids was 2.5%. The mean dry plate weight for the positive plates was 474.5 grams, while the mean dry plate weight for the negative plates was 336 grams. The positive plate group weight was 1898+/−2 grams/cell; and the negative plate group weight was 1680+/−1 grams/cell.

For the experimental batteries, the separator used was a coated polyethylene separator having a backweb thickness of about 400 microns, an overall thickness of about 1.6 mm, and a serrated profile according to FIG. 3. Such experimental separators were coated with a surfactant coating at two add-on levels: (a) 4.1 gsm; and (b) 7.4 gsm. For the control batteries, the separator used was an uncoated (not coated with the surfactant described herein) polyethylene separator having a backweb thickness of about 450 microns, an overall thickness of about 1.6 mm, and a profile different from the serrated profile seen in FIG. 3 (specifically, the profile of the control or "comparative" separator included ribs extending diagonally and continuously on the positive side of the separator at about a 10 degree angle from the vertical as well as mini-ribs extending longitudinally and continuously along the negative side of the separator, which mini-ribs were about two times higher in height than the mini-ribs of the experimental battery separators and which mini-ribs were spaced apart about 2-3 times greater than the distance spacing apart the mini-ribs 14 of the experimental battery separators).

Figure 4:
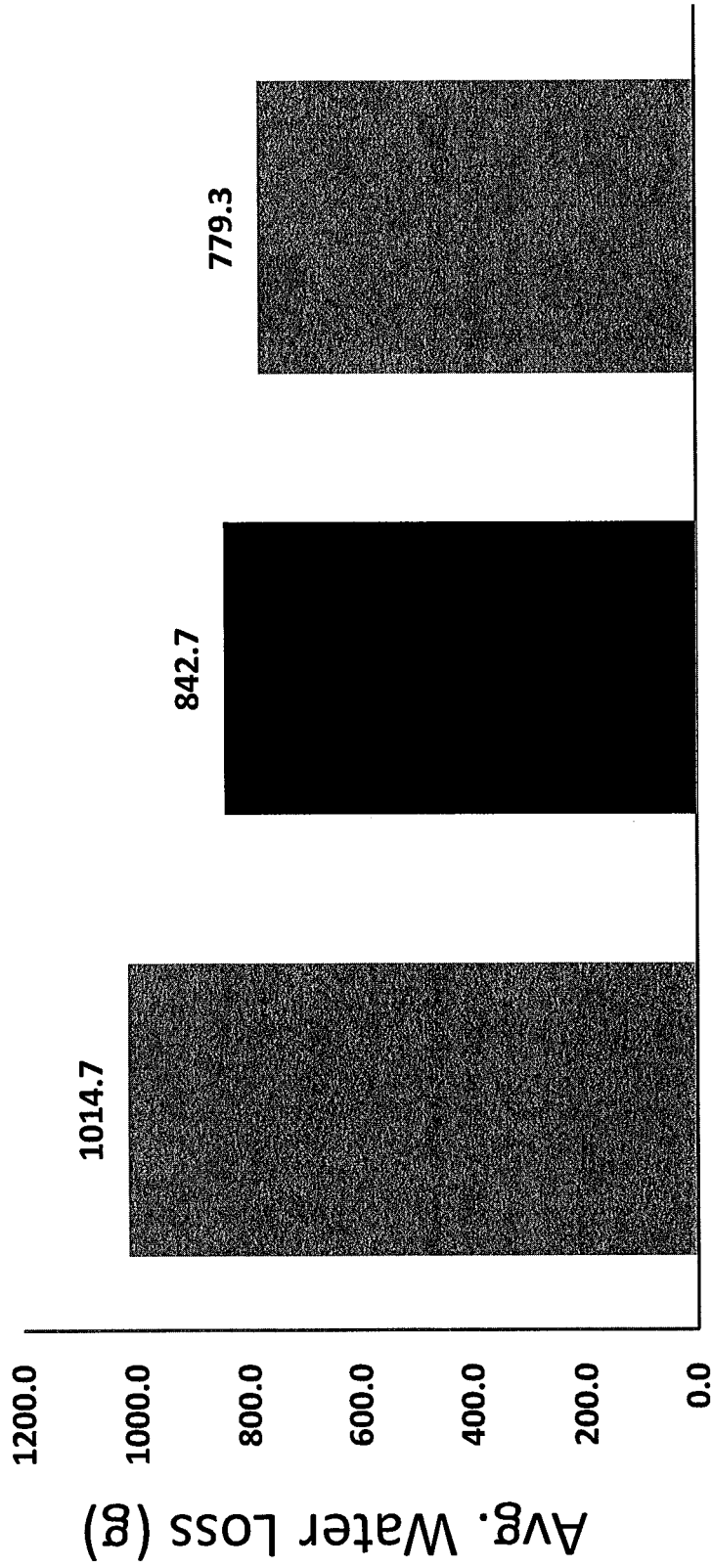
FIG. 4 includes a graph of average water loss (in grams) over the first 21 days of testing various batteries employing separators described in the Examples.
Figure 5:
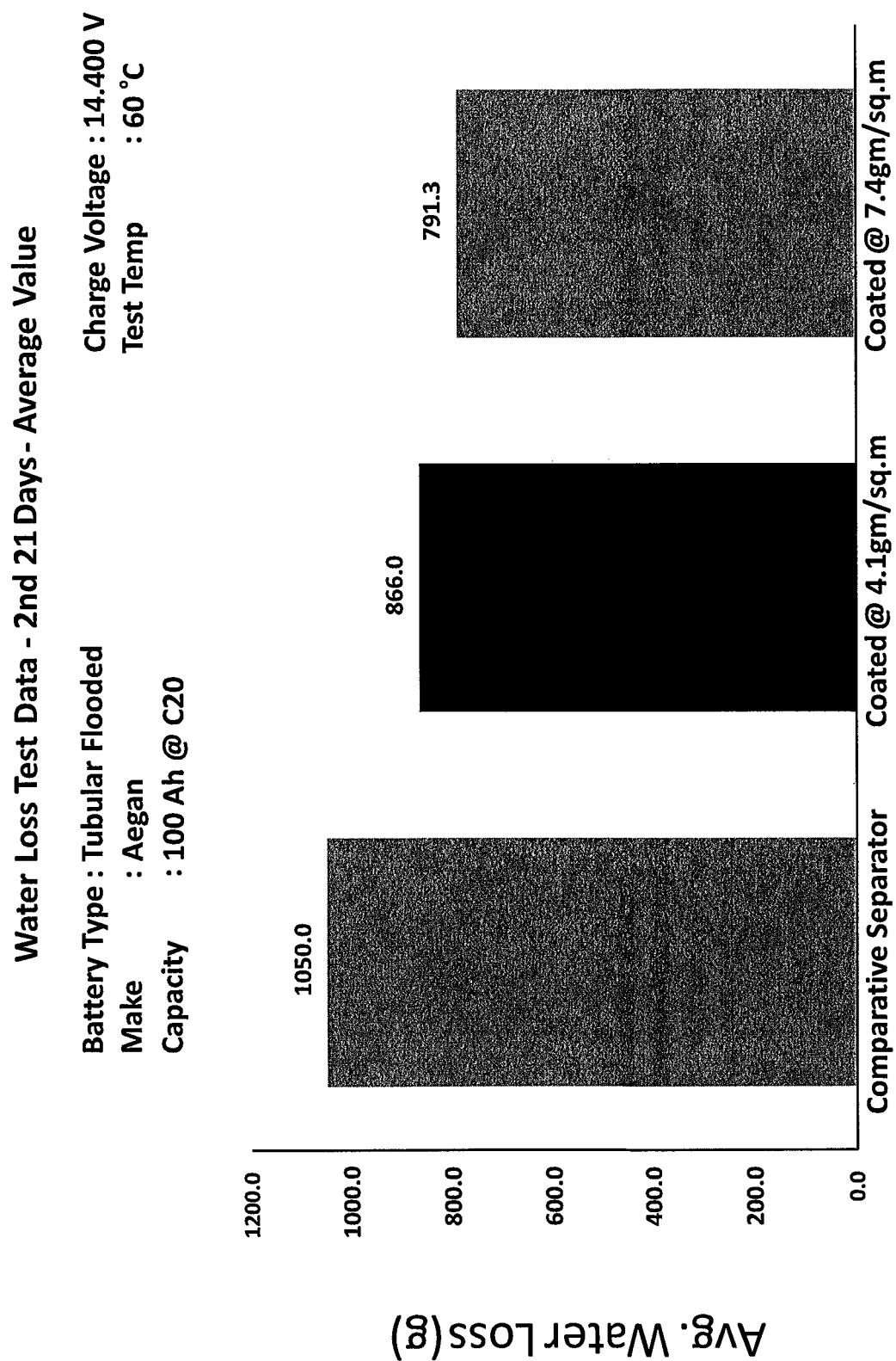
FIG. 5 includes a graph of average water loss (in grams) over the second 21 days of testing various batteries employing separators described in the Examples.
Figure 6:
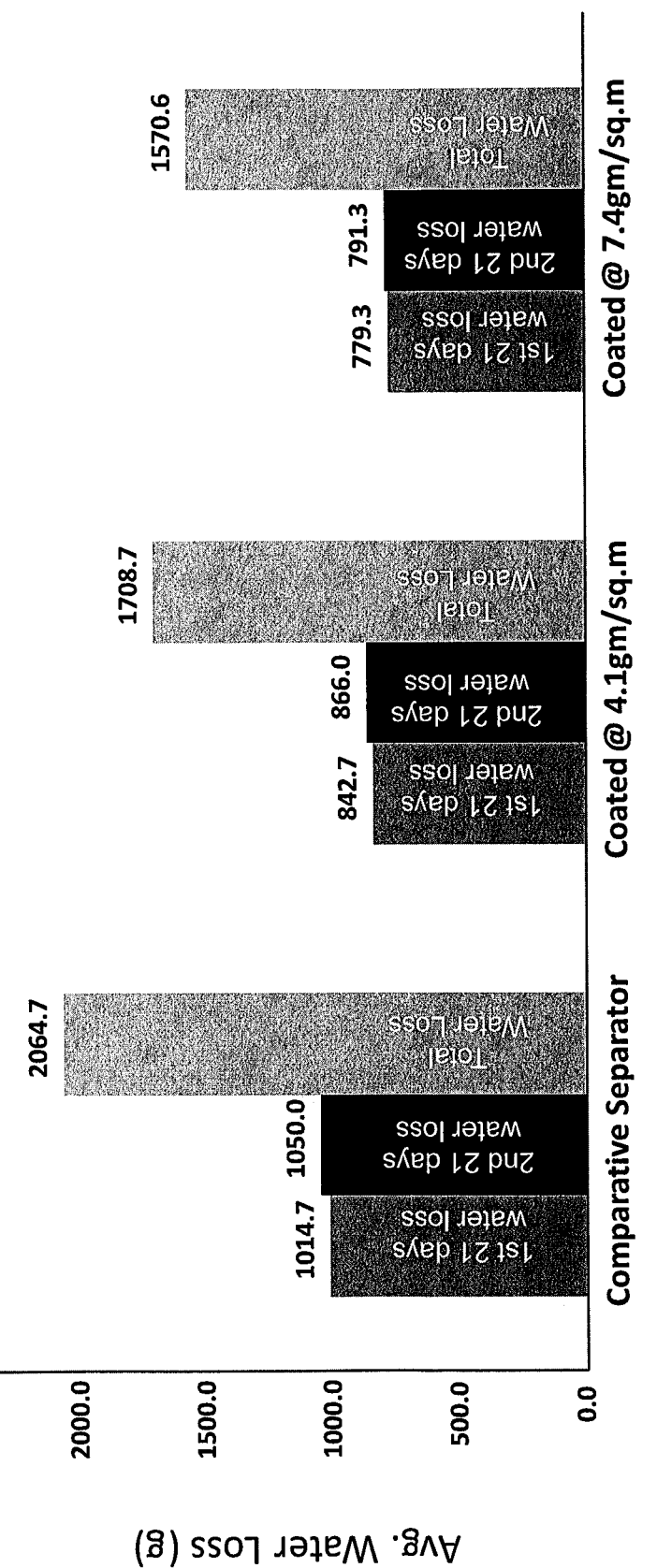
FIG. 6 includes a graph of average water loss (in grams) over the first and second 21 days of testing various batteries employing separators described in the Examples.

Batteries were formed using the comparative separator as well as the coated separator having the serrated profile according to the present invention. The batteries were tested over a period of 42 days for water loss. FIG. 4 shows that after the first 21 days of testing, the amount of water loss for the coated separator according to the present invention (779.3 grams) was much less than the amount of water loss observed for the comparative separator (1014.7 grams). FIG. 5 shows the same type of result for the second 21 days of testing. Specifically, the amount of water loss for the coated separator according to the present invention (791.3 grams) was much less than the amount of water loss observed for the comparative separator (1050.0 grams). FIG. 6 aggregates the data presented in FIGS. 4 and 5 to show the highly improved water loss performance of the a separator according to the present invention having a certain profile (e.g., a serrated profile) and a surfactant coating thereon.

Figure 7:
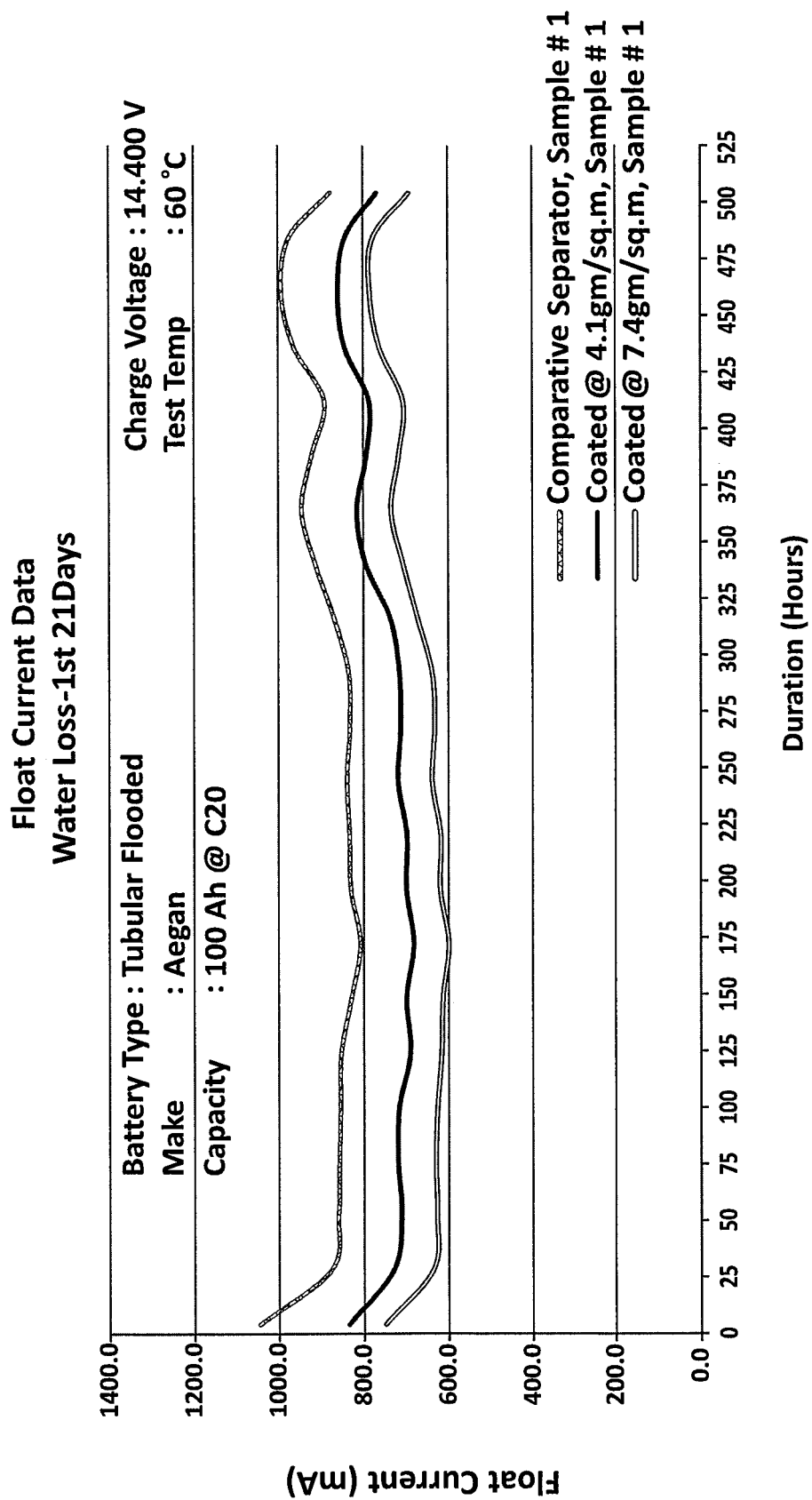
FIG. 7 includes a graph of the float current (in mAmps) over the first 21 days of testing three batteries (known as Sample #1) employing various separators described in the Examples.
Figure 8:
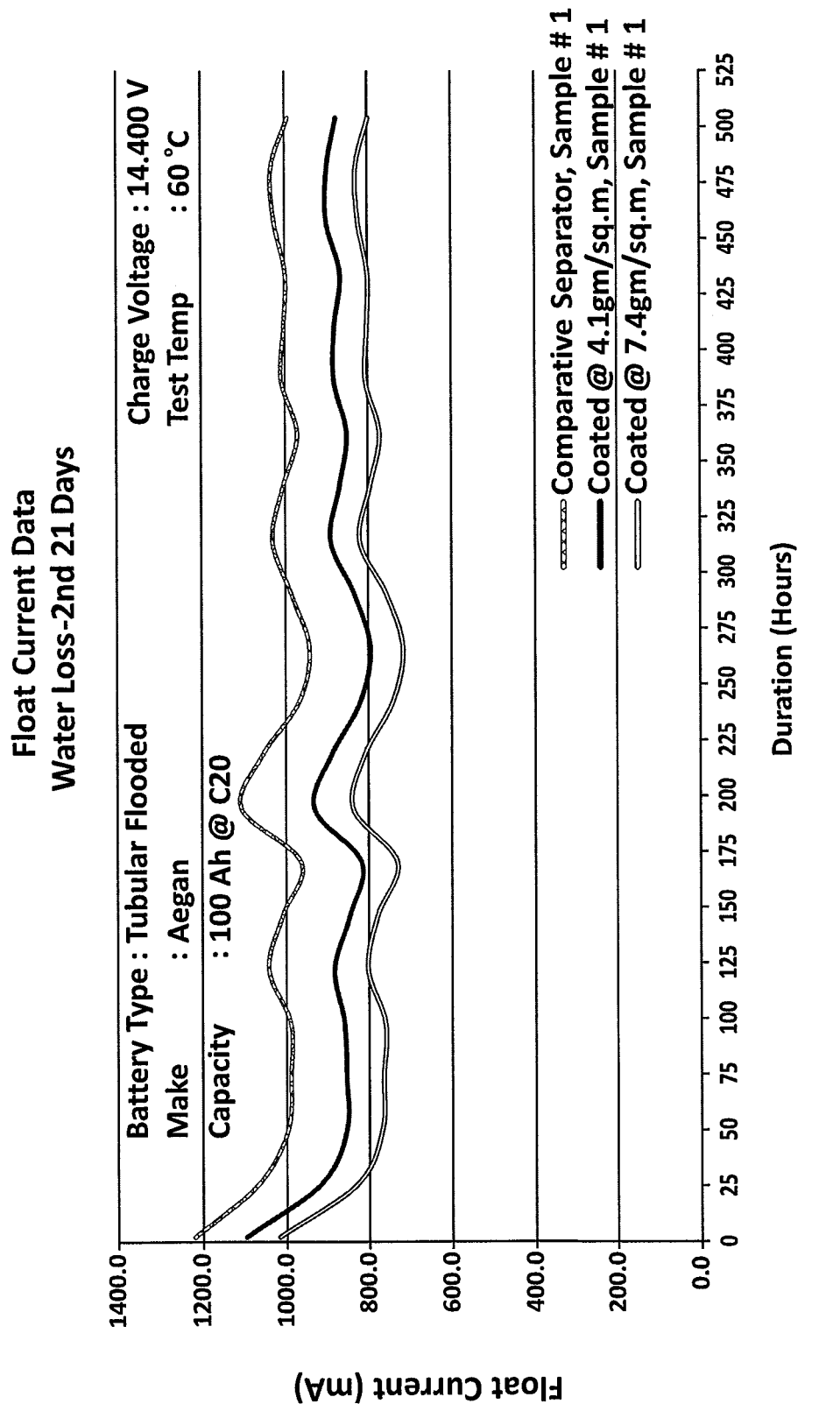
FIG. 8 includes a graph of the float current (in mAmps) over the second 21 days of testing three batteries (known as Sample #1) employing various separators described in the Examples.
Figure 9:
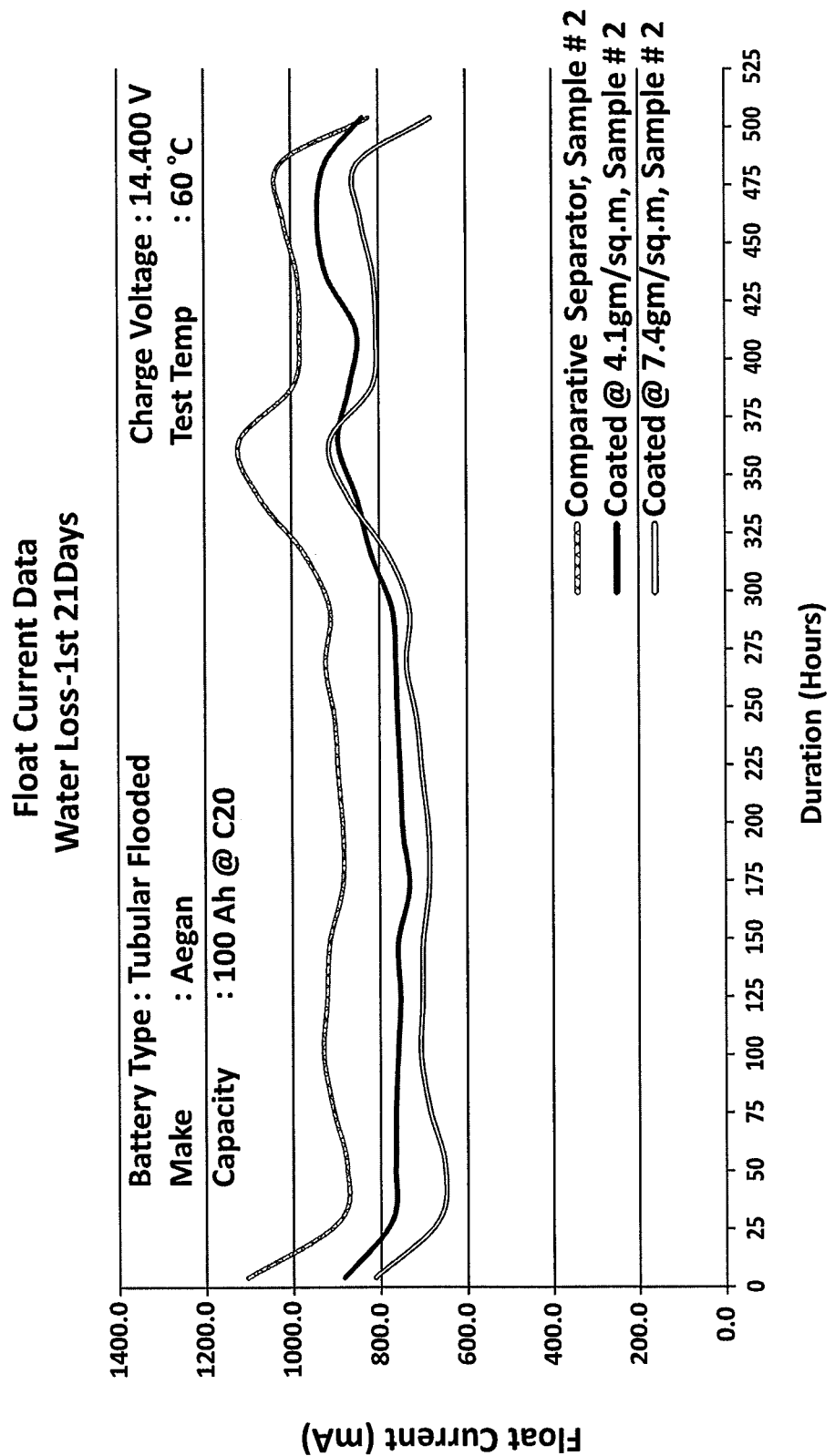
FIG. 9 includes a graph of the float current (in mAmps) over the first 21 days of testing three batteries (known as Sample #2) employing various separators described in the Examples.
Figure 10:
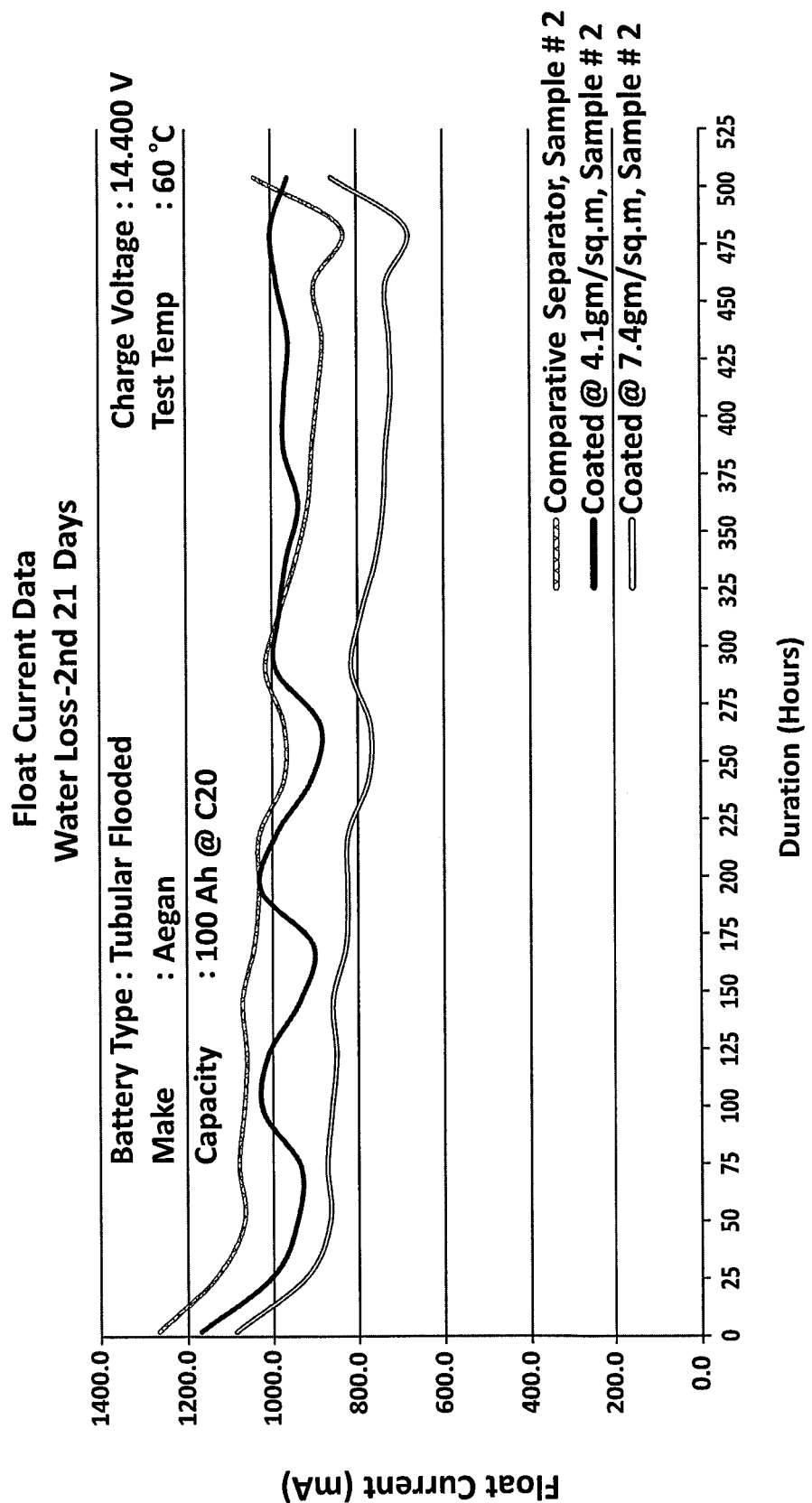
FIG. 10 includes a graph of the float current (in mAmps) over the second 21 days of testing three batteries (known as Sample #2) employing various separators described in the Examples.
Figure 11:
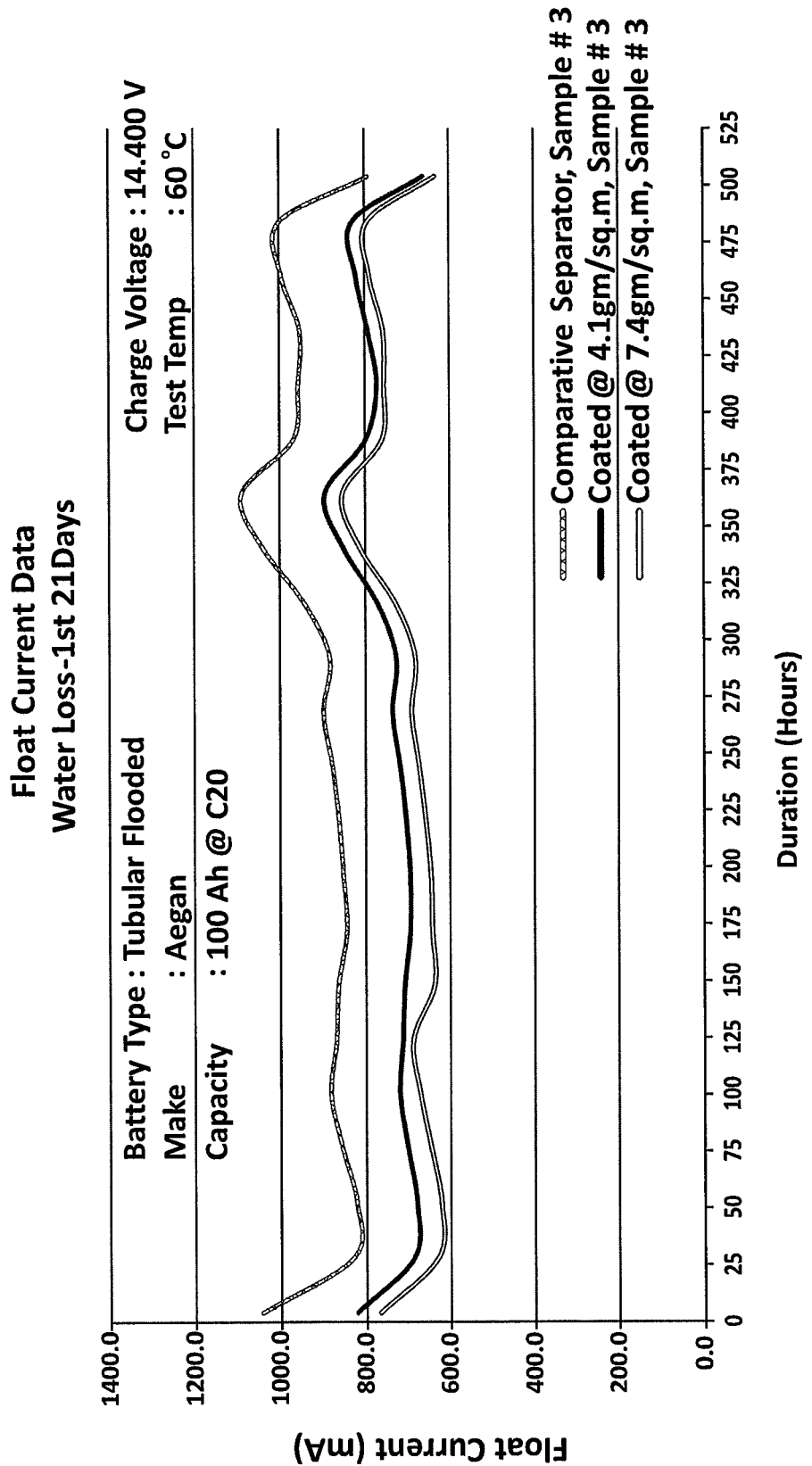
FIG. 11 includes a graph of the float current (in mAmps) over the first 21 days of testing three batteries (known as Sample #3) employing various separators described in the Examples.
Figure 12:
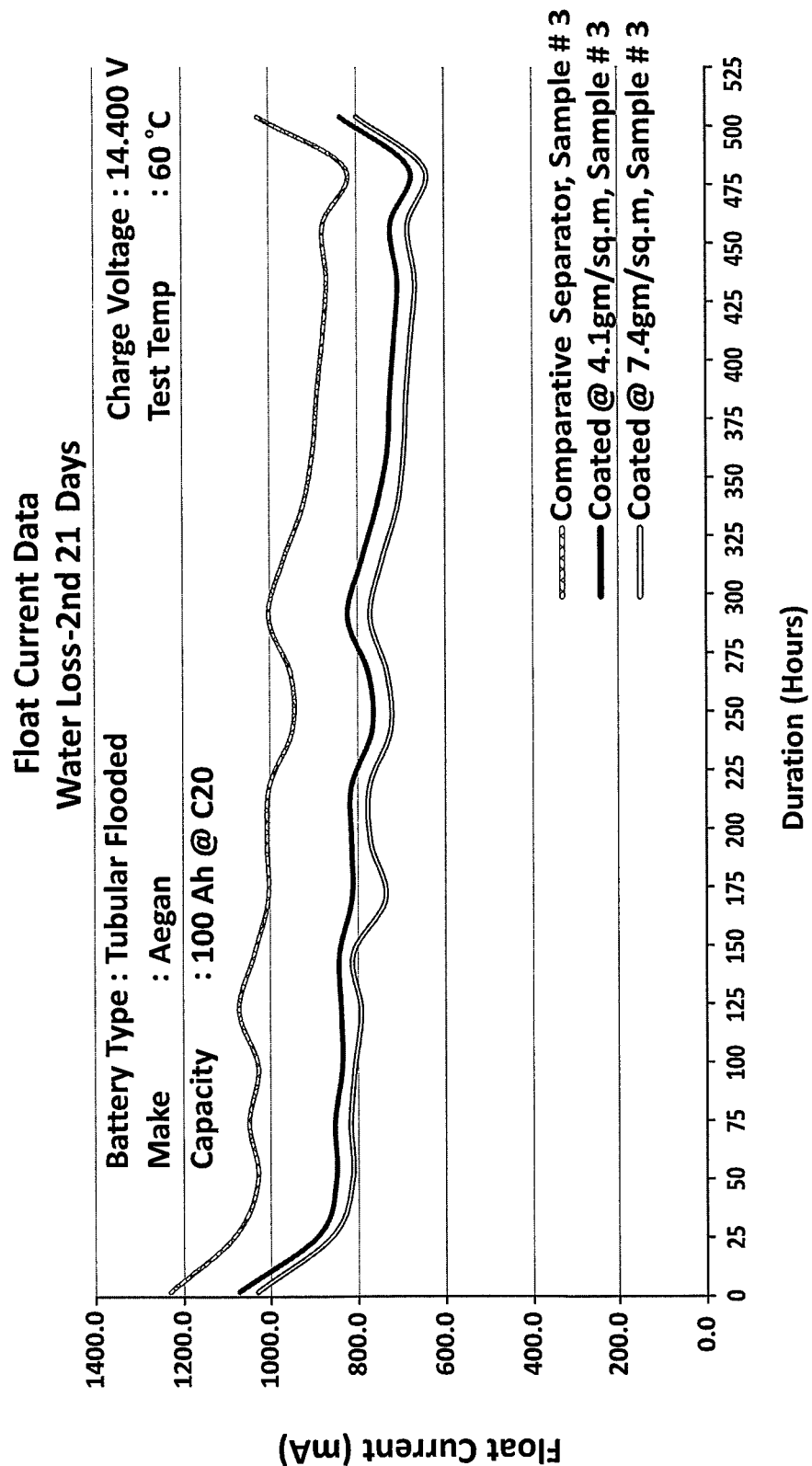
FIG. 12 includes a graph of the float current (in mAmps) over the second 21 days of testing three batteries (known as Sample #3) employing various separators described in the Examples.

Float current data was also obtained for the batteries and is presented in FIGS. 7-12. As shown in FIG. 7, the fixed voltage or maintenance voltage was noted as 14.4 Volts. FIG. 7 shows float current data for the first 21 days of water loss testing for batteries (noted as "Sample #1") containing the comparative separator as well as coated separator according to the present invention. In FIG. 7, the float current (in mAmps) for the coated separator loaded with a 7.4 gsm coating of surfactant and having a serrated profile is lower than the other two, showing that that battery, relative to the other two, exhibited lower self-discharge, and/or exhibited lower water loss (lower water consumption or electrolysis). FIG. 8 shows the same type of float current data for the batteries labeled "Sample #1" for the second 21 days of water loss testing. The same phenomenon is seen in FIG. 8: the float current is lower for the separator coated with a 7.4 gsm coating of surfactant and having a serrated profile.

Similarly to FIGS. 7 and 8, FIGS. 9 and 10 show the same type of data for the batteries noted as "Sample #2." Similarly to FIGS. 9 and 10, FIGS. 11 and 12 show the same type of data for the batteries noted "Sample #3."

Figure 13:
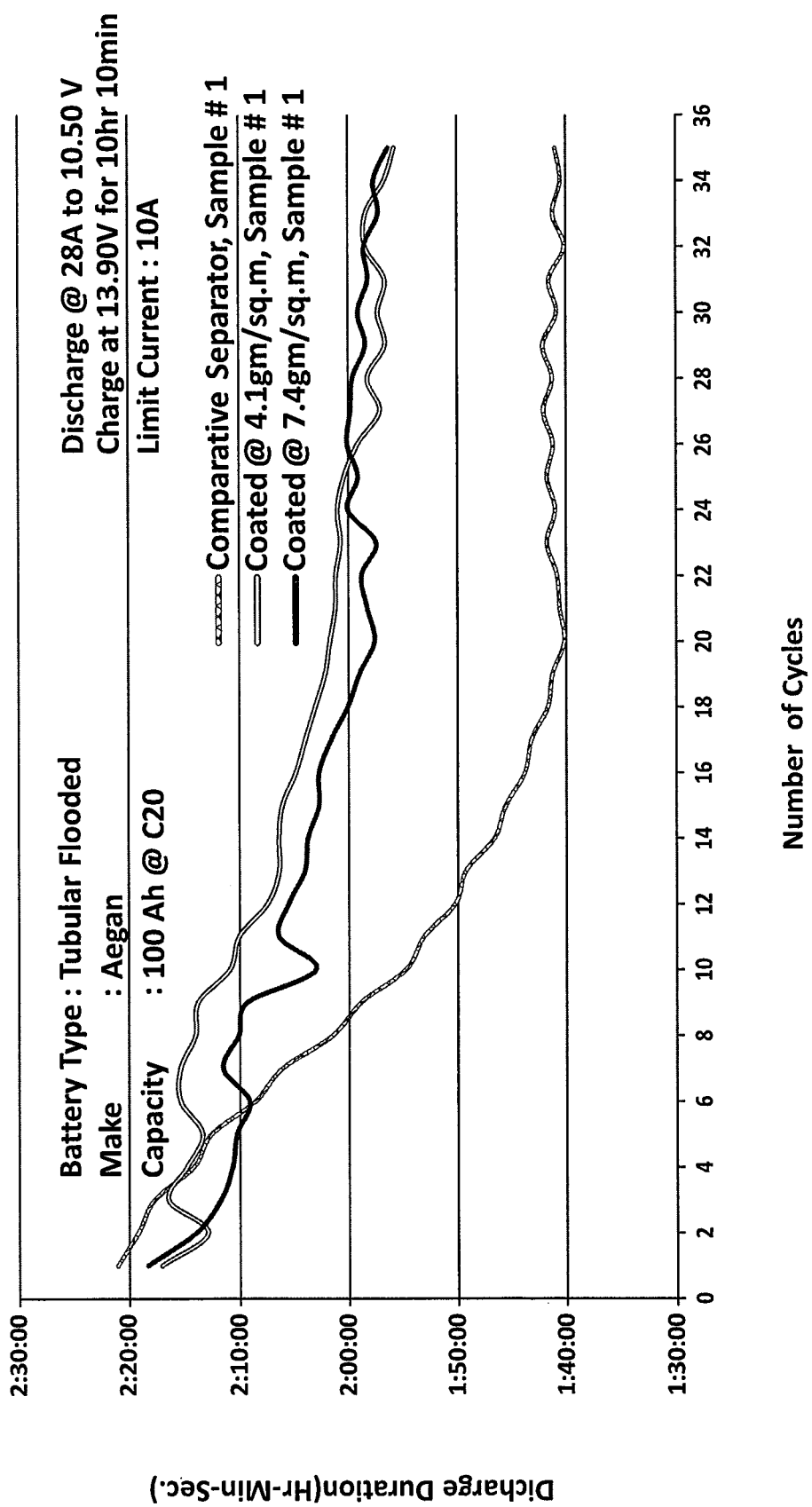
FIG. 13 includes a graph showing the back up time for batteries (known as Sample #1) employing three different separators described in the Examples.
Figure 14:
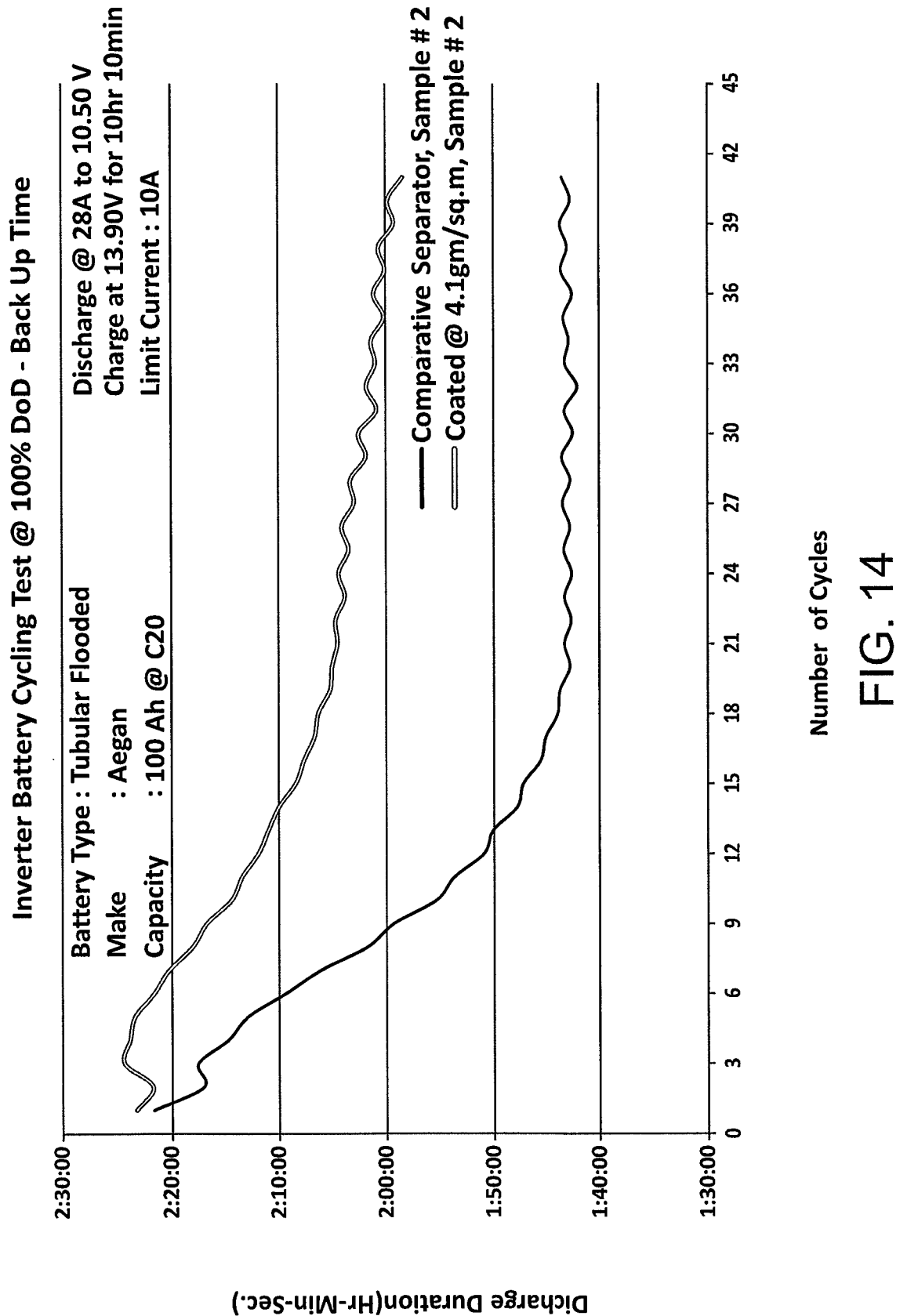
FIG. 14 includes a graph showing the back up time for batteries (known as Sample #2) employing two different separators described in the Examples.

Additional testing of the batteries was performed to determine the discharge duration of the batteries as a function of the number of cycles (see FIG. 13 for example). During this testing, the 100% DoD notation stands for "100% depth of discharge," and the batteries were tested to determine the back up time for each battery. The back-up time may refer to the amount of time during which a user can draw energy from the battery. FIGS. 13 and 14 showed that by using the separator according to the present invention, the length of time during which the battery can operate near its max capacity is extended. And by using the separator of the present invention, additional battery use time per cycle results, which is highly desirable.

The batteries in these Examples were also looked at from the perspective of specific gravity of the electrolyte. As a battery is cycled, the sulphuric acid in the electrolyte of the battery system can become stratified into layers of varying concentration. It can be important to minimize such acid stratification and to keep the specific gravity of the electrolyte consistent, which may lead to extended battery life.

Figure 15:
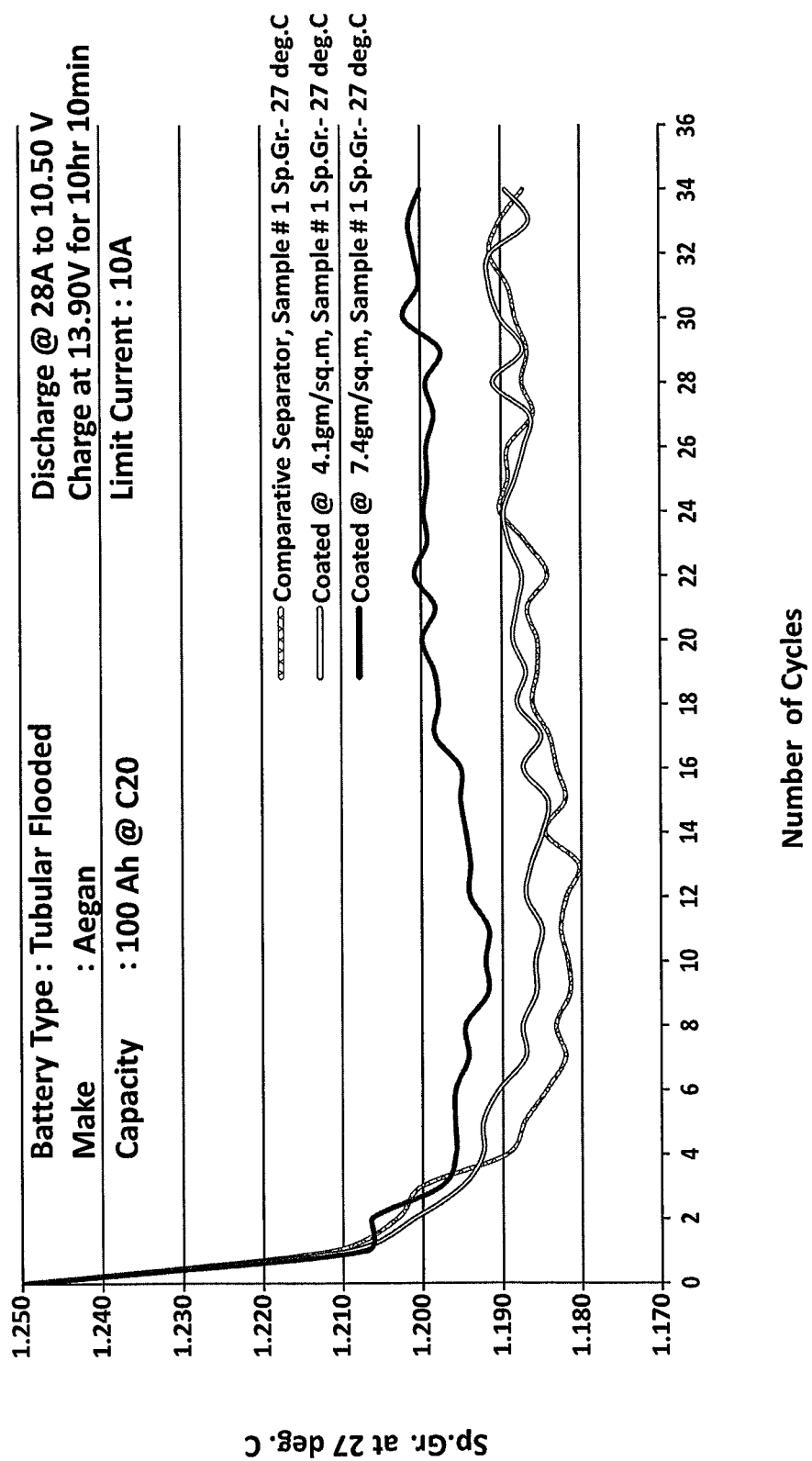
FIG. 15 includes a graph showing specific gravity trends for the electrolyte inside batteries (known as Sample #1) employing three different separators described in the Examples.
Figure 16:
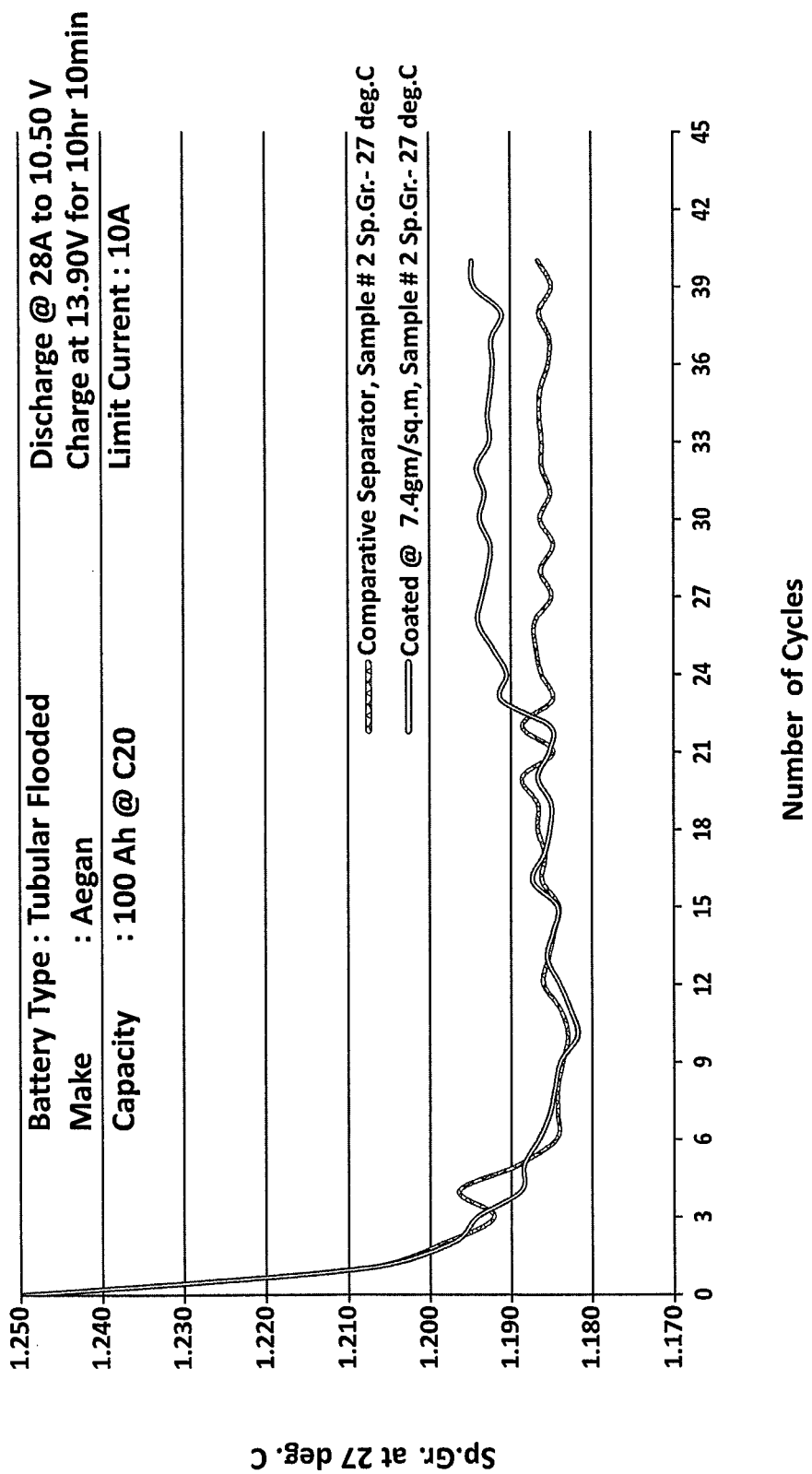
FIG. 16 includes a graph showing specific gravity trends for the electrolyte inside batteries (known as Sample #2) employing two different separators described in the Examples.

FIGS. 15 and 16 show results of battery testing done to show specific gravity trends for the electrolyte within such batteries as a number of battery cycles occurred. For both FIGS. 15 and 16, coated battery separators formed having a serrated profile showed desirable data regarding specific gravity trends.

Figure 17:
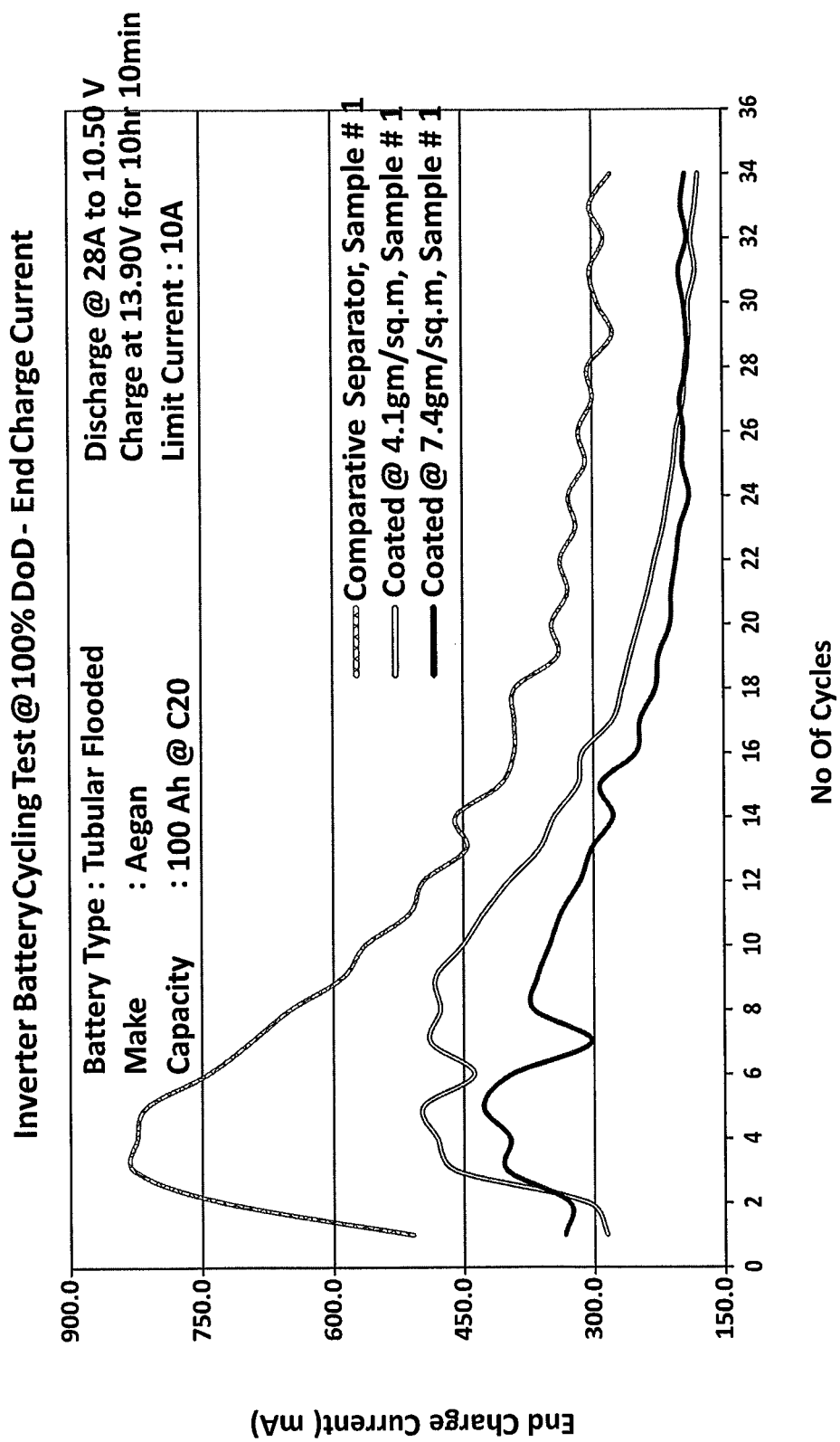
FIG. 17 includes a graph showing the end charge current (in mAmps) over a number of cycles for batteries (known as Sample #1) employing three different separators described in the Examples.
Figure 18:
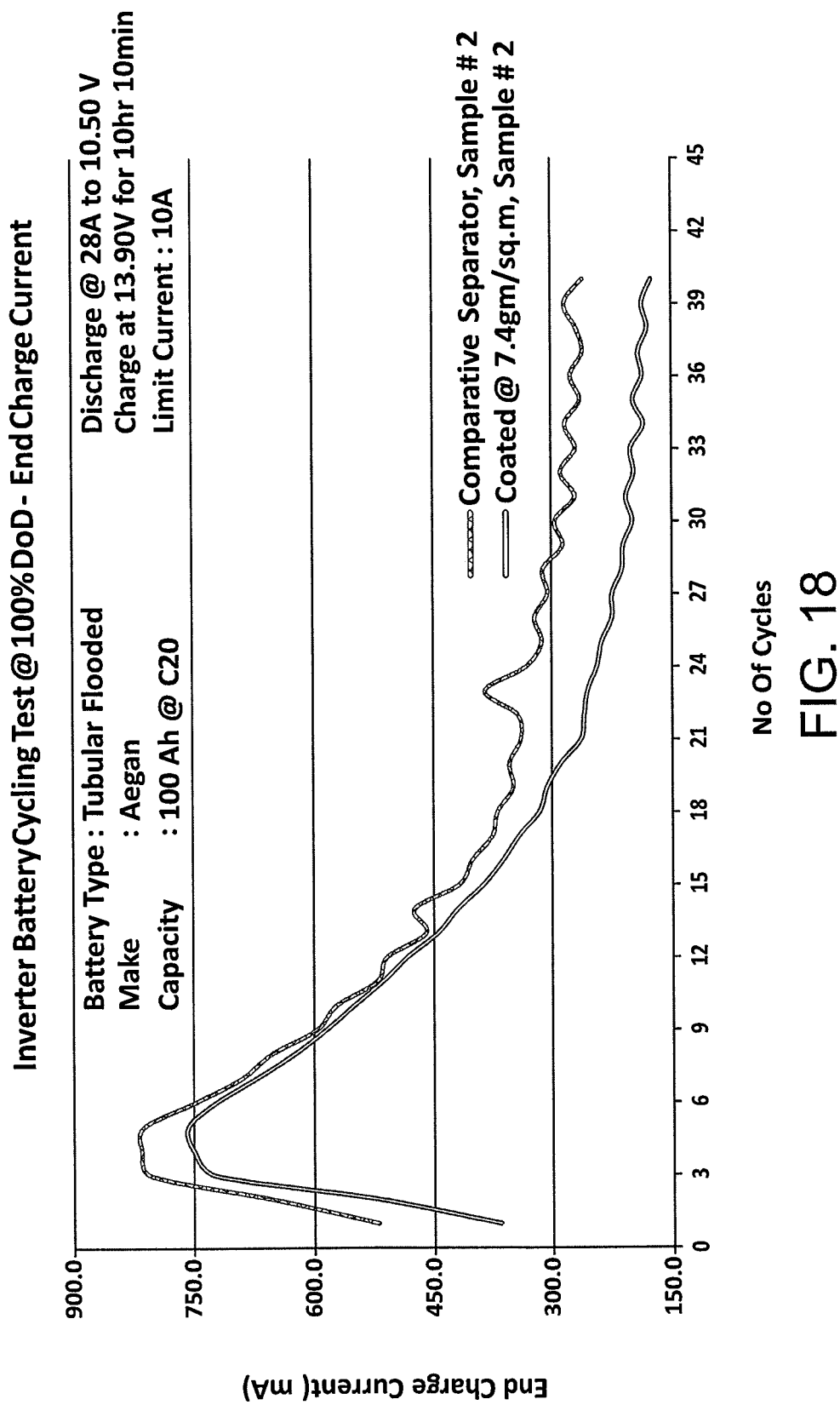
FIG. 18 includes a graph showing the end charge current (in mAmps) over a number of cycles for batteries (known as Sample #2) employing two different separators described in the Examples.
Figure 19A:
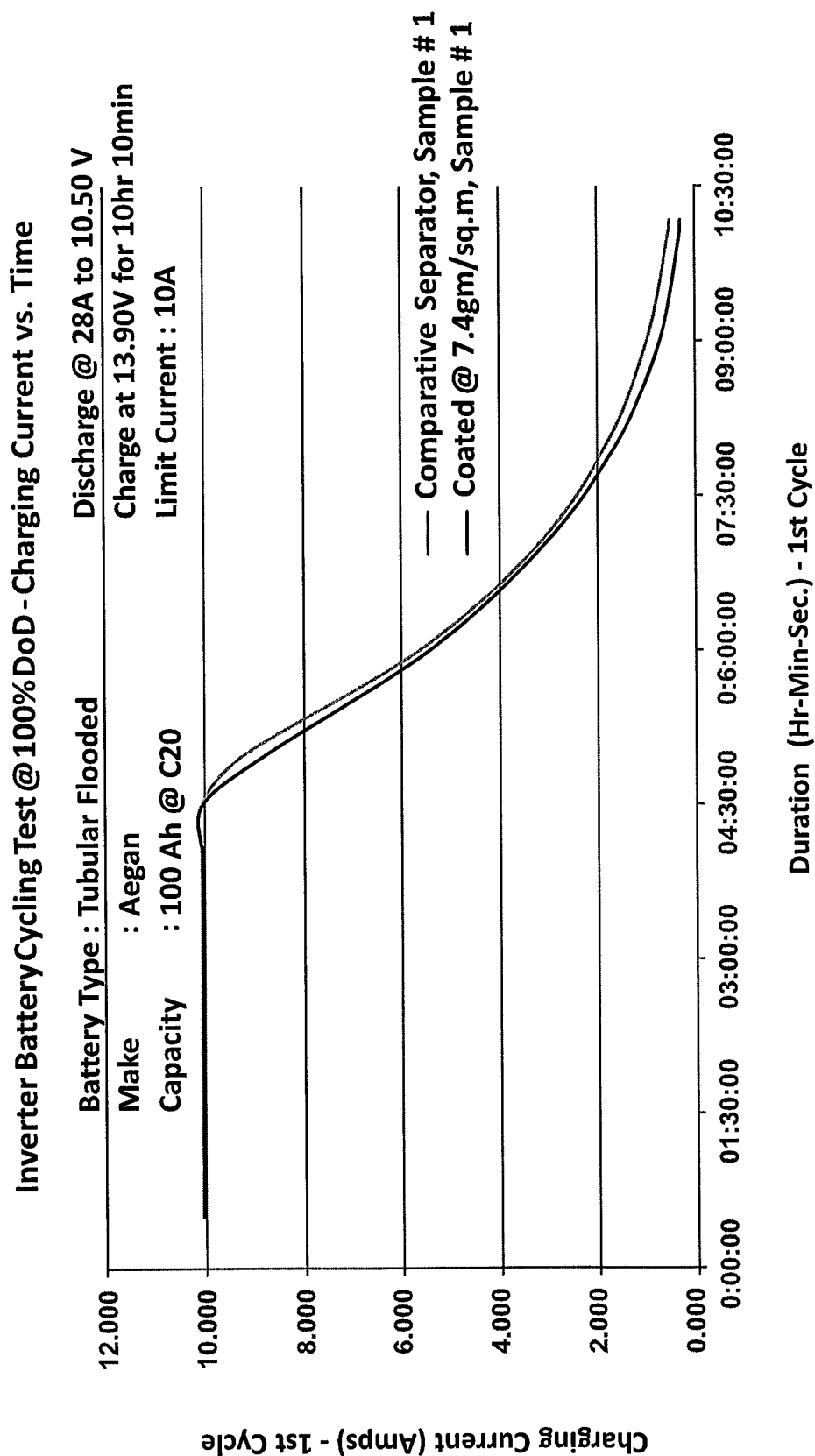
FIGS. 19(a)-19(d) include four graphs showing charging current (in Amps) versus time for batteries (known as Sample #1) after given numbers of cycles and employing two different separators described in the Examples.
Figure 19B:
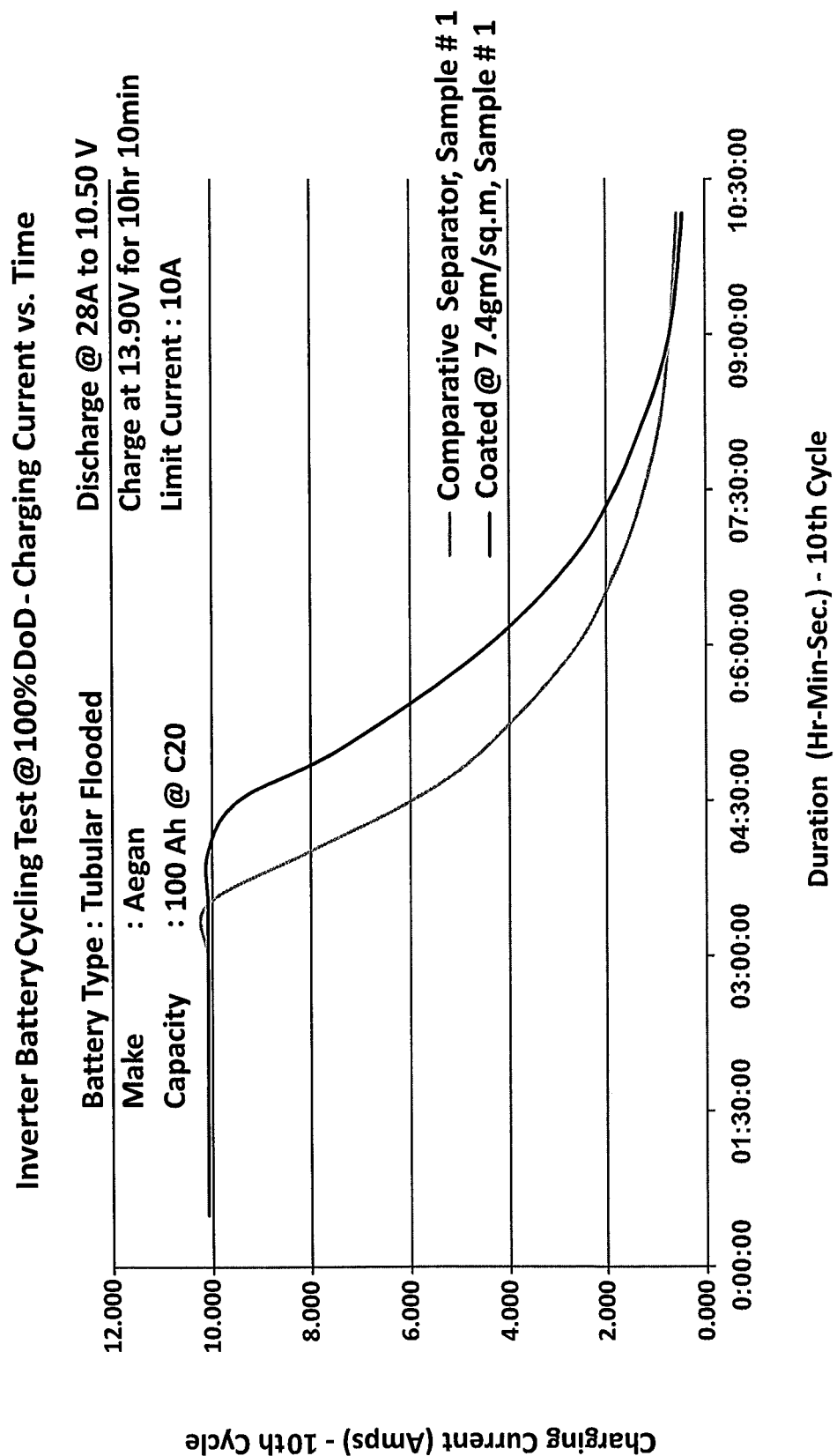
Figure 19C:
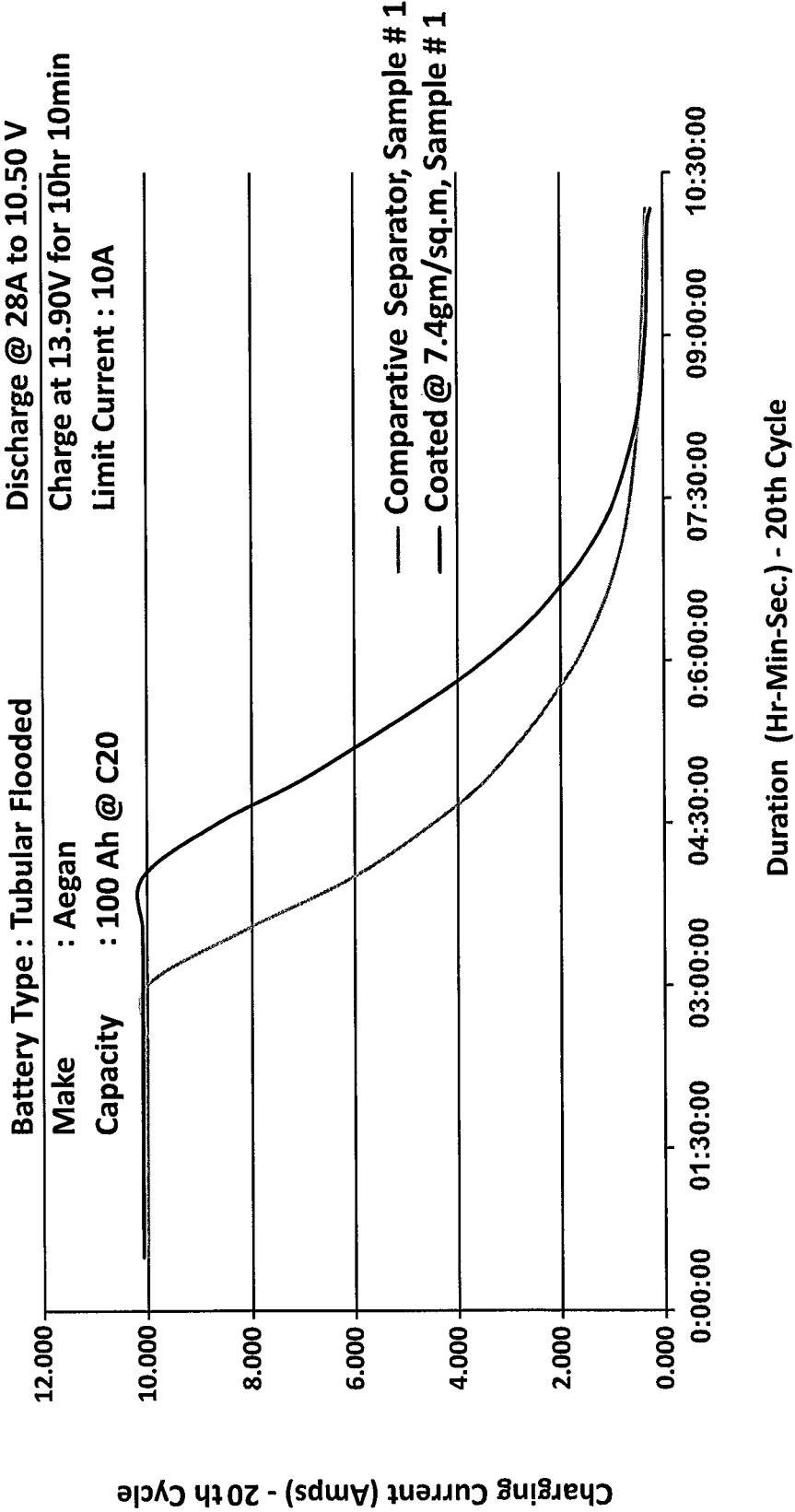
Figure 19D:
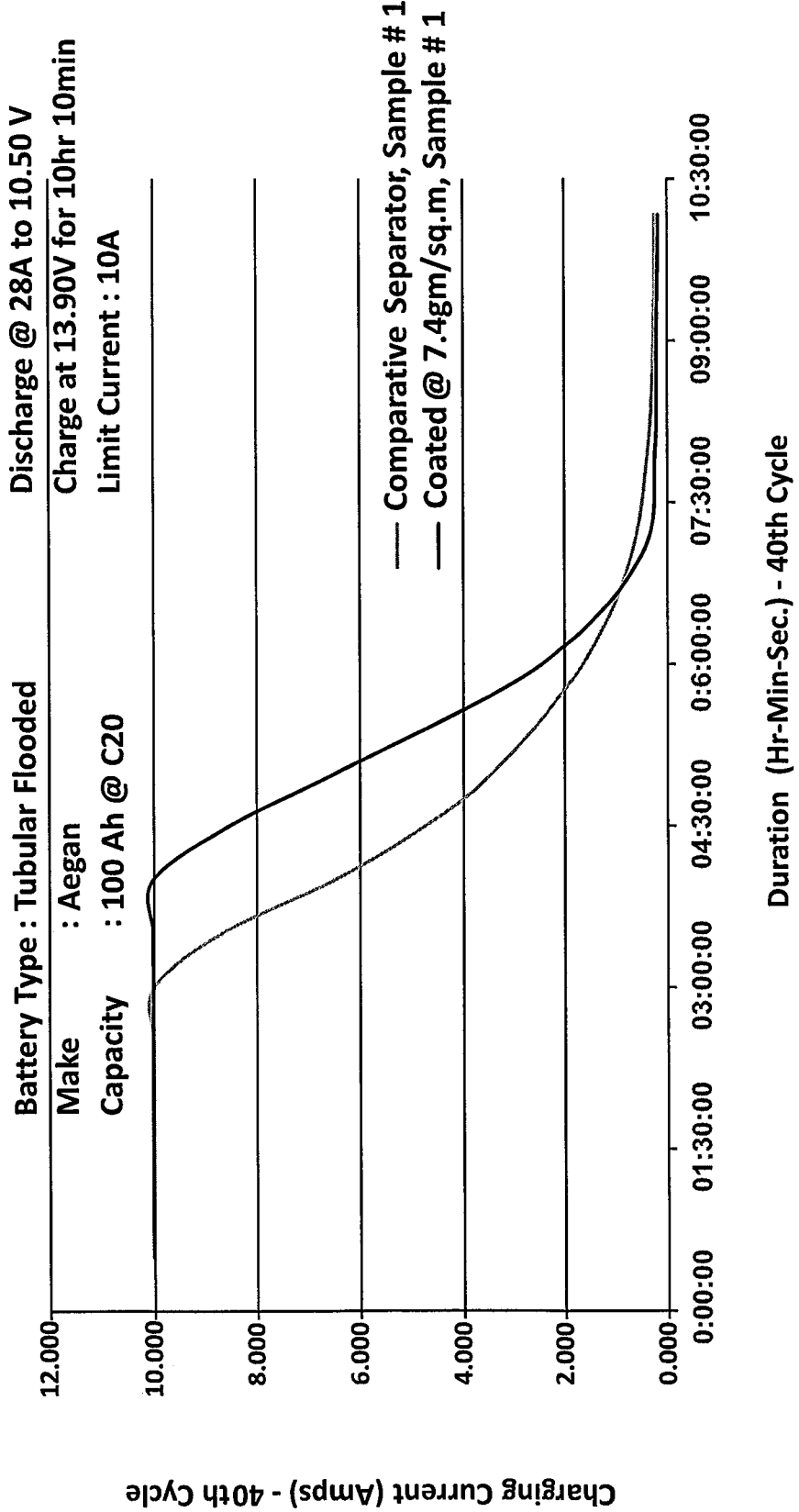
Figure 20A:
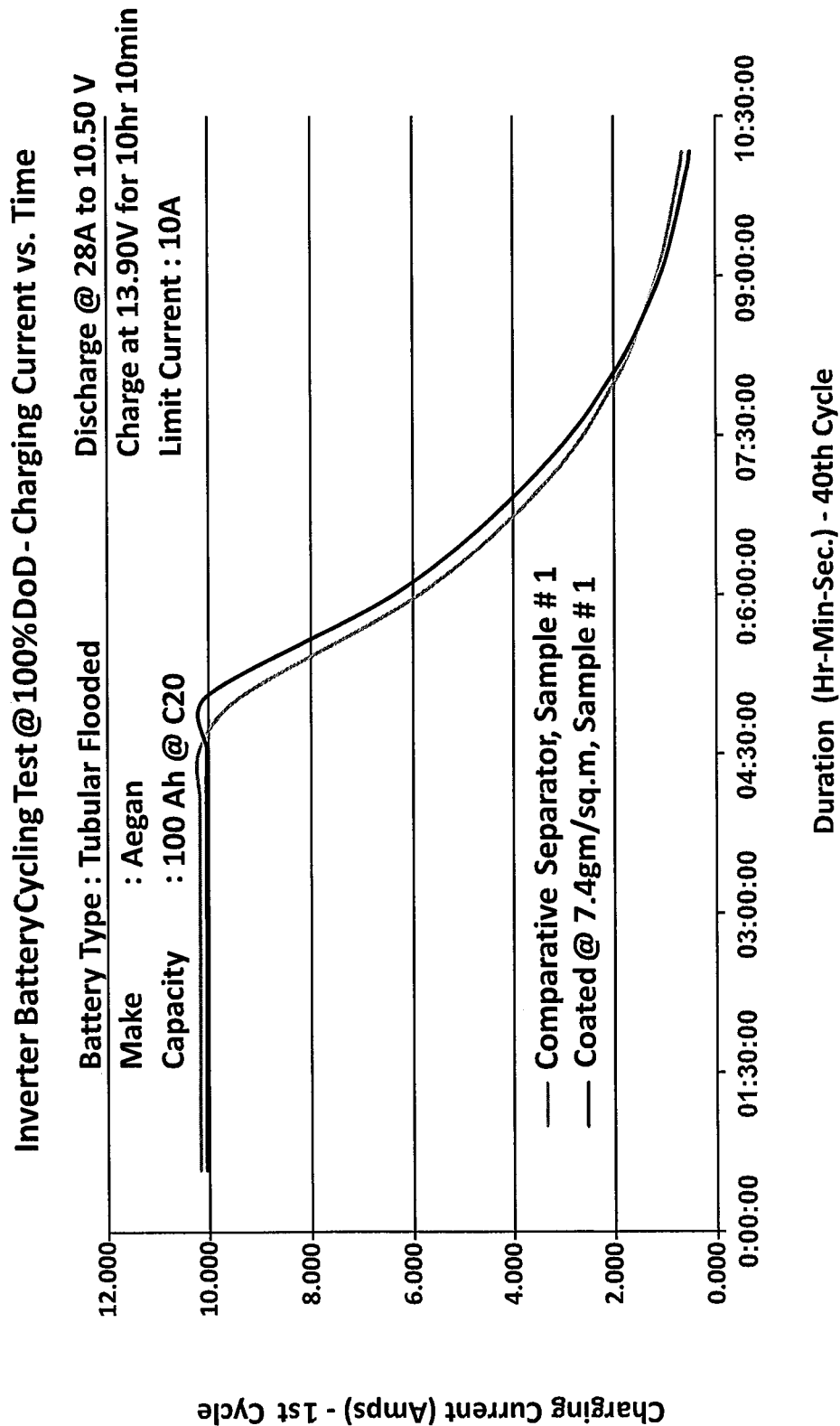
FIGS. 20(a)-20(d) include four graphs showing charging current (in Amps) versus time for batteries (known as Sample #2) after given numbers of cycles and employing two different separators described in the Examples.
Figure 20B:
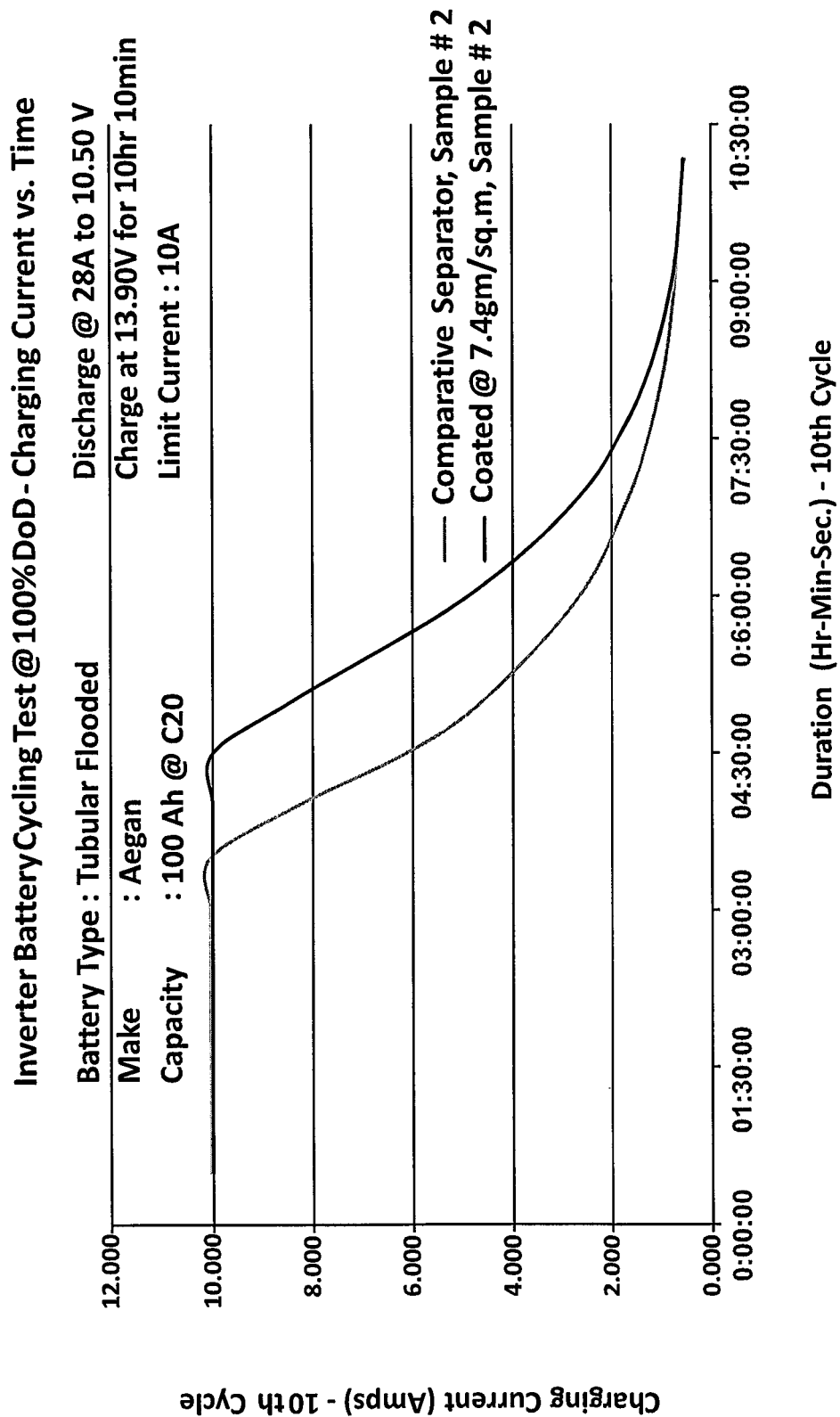
Figure 20C:
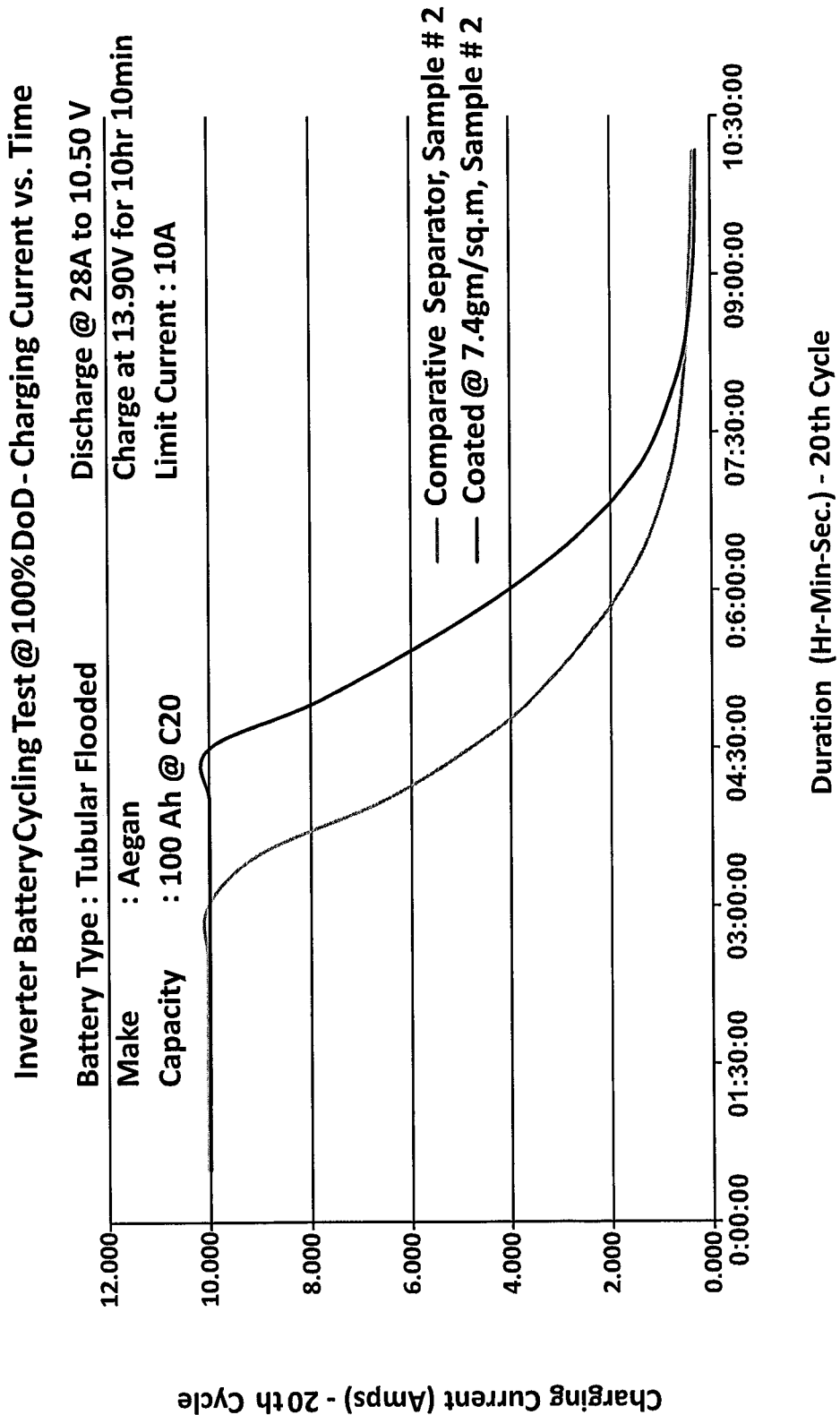
Figure 20D:
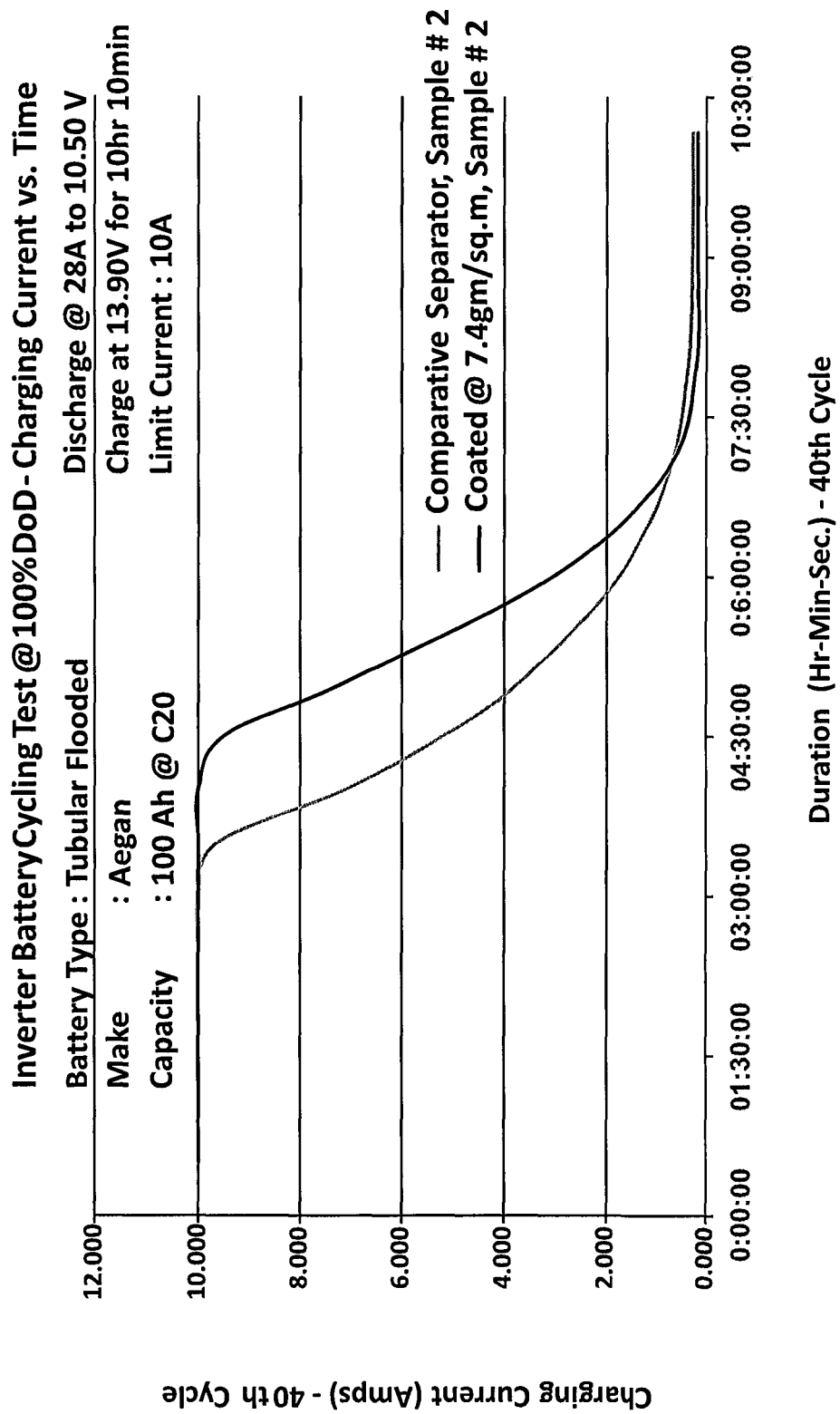

The batteries formed for these Examples were also tested for end charge current (in mAmps). The data for such testing is shown in FIGS. 17 and 18. The lower end charge current (in mAmps), for example, for the coated separator in FIG. 18 having a 7.4 gsm coating of surfactant thereon as well as a serrated profile, represents a sign of less water loss for the batteries using the separators coated with surfactant and having a serrated profile according to the present invention.

Finally, the batteries formed for these Examples were also tested to determine charging current (in Amps) versus duration at various cycles. Essentially, this testing helped to determine how quickly the various batteries could be recharged. The results depicted in FIGS. 19(*a*) through 19(*d*) and FIGS. 20(*a*) through 20(*d*) showed that batteries incorporating the coated separators according to the present invention (those having a serrated profile) were able to accept the maximum amount of charge for a longer time period. Therefore, using a battery separator according to various embodiments described herein results in retaining performance capability throughout the cycle life of the battery. Improving cycle life, retaining performance capability throughout cycle life, improving re-chargeability, improving charge acceptance, and improving (by reducing) the amount of water loss encountered by a battery are all highly desirable characteristics which may be associated with battery separators according to various embodiments presented herewith.

In accordance with at least selected embodiments, aspects, or objects, the present invention may address the limitations of the prior art and is directed to new, improved or optimized battery separators, components, batteries, inverters, accumulators, systems, methods, profiles, additives, compositions, composites, mixes, coatings, and/or related methods of water retention, water loss prevention, improved charge acceptance, production, use, and/or combinations thereof. More particularly, the present invention is directed to one or more improved battery separators having various improvements that may result in decreased water loss for a battery in which such a separator is incorporated, enhanced charge acceptance, or combinations thereof. Additionally, the present invention relates to one or more improved battery separators having various improvements with regard to shape, and/or physical profile, and/or chemical(s), additives, mixes, coatings, and/or the like used to make such battery separators (such as oil(s), and/or chemical additive(s) or agents used to coat, finish or improve such battery separators (such as surfactant(s))). The improved battery separators of the instant invention are particularly useful in or with industrial batteries, such as inverter batteries, batteries for heavy or light industry, and so forth. In accordance with at least selected embodiments, aspects, or objects, the present invention may provide or be directed to: new, improved or optimized battery separators for an industrial battery as described and/or shown herein; new, improved or optimized battery separators, components, batteries, inverters, accumulators, systems, methods, profiles, additives, compositions, composites, mixes, coatings, and/or related methods of water retention, water loss prevention, improved charge acceptance, production, use, and/or combinations thereof; one or more improved battery separators having various improvements that may result in decreased water loss for a battery in which such a separator is incorporated, enhanced charge acceptance, or combinations thereof; one or more improved battery separators having various improvements with regard to shape, and/or physical profile, and/or chemical(s), additives, mixes, coatings, and/or the like used to make such battery separators (such as oil(s), and/or chemical additive(s) or agents used to coat, finish or improve such battery separators (such as surfactant(s))); improved battery separators particularly useful in or with industrial batteries, such as inverter batteries, batteries for heavy or light industry, and so forth; new, improved or optimized battery separators and methods relating to batteries, including, but not limited to, industrial batteries, wherein the battery separator may have an improved physical shape and/or profile and may include an optimized amount of one or more chemical additives or agents, such as one or more surfactants, to provide the improved battery separator with improved properties; one or more improved battery separators having various improvements with regard to shape, and/or physical profile, and/or chemical(s) used to make such battery separators (such as oil), and/or chemical additive(s) used to coat, finish or improve such battery separators (such as surfactants); improved battery separators and/or methods providing improved battery properties for batteries into which such separators are incorporated, such improved properties may include, but are not limited to, increased charge acceptance for the battery in which the separator is used and increased re-chargeability for such battery as well as decreased water loss for such a battery; an improved battery separator that results in improvements in battery characteristics, such as improved charge acceptance of the battery, improved re-chargeability of the battery, reduced water loss of the battery, improved charge/discharge cycling efficiency of the battery, and/or extended life of the battery; improved battery separators of any of the above having the serrated rib profile of FIG. 3; and/or the improved battery separators above having a surfactant coating thereon and being particularly useful in or with lead acid batteries, flooded lead acid batteries, industrial batteries, such as inverter batteries, batteries for heavy or light industry, and/or the like.

In accordance with at least selected embodiments, aspects, or objects, the present invention may provide or be directed to: new, improved or optimized batteries including the above described separators; a battery or batteries comprising i) a separator, wherein the separator has a serrated profile, wherein the separator further has an amount of surfactant therein, thereon, or both, wherein the surfactant has an HLB value of lower than about 6; and ii) one or more plates or electrodes, wherein at least one plate or electrode comprises antimony (Sb); the above batteries wherein at least one of: said at least one plate or electrode comprises antimony (Sb) in an amount from less than about 1% to more than 5%; said battery is not sealed; said separator comprises polymer, one or more fillers, and one or more plasticizers or oils; said polymer is polyolefin; said polyolefin is polyethylene, polypropylene, or blends or combinations thereof; said separator is used with or laminated to another layer; said another layer is a glass layer, a polymer layer, a nonwoven layer, or a layer that includes both glass fibers and some polymer fiber; said separator includes a backweb, protrusions or nubs extending from the positive side of the backweb, and optionally smaller protrusions or mini-ribs or NCR extending from the negative side of the backweb; the backweb of the separator has a thickness from about 200 microns to about 500 microns; said surfactant is one that is not soluble in water, aqueous solution, or sulphuric acid and has an HLB value of from about 1 to about 3; the add-on level of the surfactant is up to 10 g per square meter of said separator; and/or the like; a method of use of i) a battery separator, wherein the separator has a serrated profile, wherein the separator further has an amount of surfactant therein, thereon, or both, wherein the surfactant has an HLB value of lower than about 6; in a battery, the battery further comprising ii) one or more plates or electrodes, wherein at least one plate or electrode comprises antimony (Sb); wherein the battery is an inverter battery, for decreasing water loss of said battery; wherein the decrease of water loss of the inverter battery is during deep discharge of said battery; use of i) a battery separator, wherein the separator has a serrated profile, wherein the separator further has an amount of surfactant therein, thereon, or both, wherein the surfactant has an HLB value of lower than about 6; in a battery, the battery further comprising ii) one or more plates or electrodes, wherein at least one plate or electrode comprises antimony (Sb); wherein the battery is an inverter battery, for improving re-chargeability of said inverter battery; wherein said inverter battery is a tubular inverter battery; and/or the like.

In accordance with at least selected embodiments, aspects, or objects, the present invention may address the limitations of the prior art and/or provides or is directed to new, improved or optimized battery separators, components, batteries, industrial batteries, inverter batteries, batteries for heavy or light industrial applications, forklift batteries, float charged batteries, inverters, accumulators, systems, methods, profiles, additives, compositions, composites, mixes, coatings, and/or related methods of water retention, water loss prevention, improved charge acceptance, production, use, and/or combinations thereof.

The present invention may be embodied in other forms without departing from the spirit and the essential attributes thereof, and, accordingly, reference should be made to the appended claims, rather than to the foregoing specification, as indicating the scope of the invention. Additionally, the invention illustratively disclosed herein suitably may be practiced in the absence of any element which is not specifically disclosed herein. Many other modifications and variations of the present invention are possible to the skilled practitioner in the field in light of the teachings herein. It is therefore understood that, within the scope of the claims, the present invention can be practiced other than as herein specifically described.

The invention claimed is:

1. A battery comprising:
   a separator having a microporous polymer backweb with a serrated and staggered rib profile, the backweb comprising a polymer, one or more fillers, and one or more plasticizers or oils,
   wherein the separator has an amount of surfactant coated thereon; both;
      wherein the amount of surfactant is in a range of about 4.1 to 10.0 grams per square meter;
      wherein the surfactant has a hydrophile lipophile balance (HLB) value from 1 to 3; and
   one or more plates or electrodes, at least one plate or electrode comprising antimony (Sb);
   wherein the battery has an improved water loss over an initial twenty one day period of at least 17% compared to a battery without the surfactant.

2. The battery according to claim 1 wherein said Sb is present in an amount of more than 2.5 wt. %.

3. The battery according to claim 1 wherein said battery is not sealed.

4. The battery according to claim 1 wherein said filler comprises silica.

5. The battery according to claim 1 wherein said polymer is polyolefin.

6. The battery according to claim 5 wherein said polyolefin is polyethylene, polypropylene, or blends or combinations thereof.

7. The battery according to claim 1 wherein said separator is used with or laminated to another layer.

8. The battery according to claim 7 wherein said another layer is a glass layer, a polymer layer, a nonwoven layer, or a layer that includes both glass fibers and some polymer fibers.

9. The battery according to claim 1 wherein said serrated and staggered rib profile extends from a positive side of the backweb that faces a cathode of the battery.

10. The battery according to claim 9 wherein said separator includes ribs extending from a negative side of the backweb that faces a negative electrode or plate of the battery.

11. The battery according to claim 1 wherein the backweb of the separator has a thickness from about 200 microns to about 500 microns.

12. The battery according to claim 1 wherein said surfactant is one that is not soluble in water, and has an HLB value from about 1 to about 3.

13. A method for decreasing water loss in a battery having one or more plates or electrodes which comprise antimony (Sb), the method comprising the steps of:

placing or providing a battery separator into a battery, wherein the battery separator includes a microporous polymer backweb with a serrated and staggered rib profile;
  wherein the separator includes an amount of surfactant coated thereon;
  wherein the amount of surfactant is in a range of 4.1 to 10.0 grams per square meter;
  wherein the surfactant has a hydrophile lipophile balance (HLB) value from 1 to 3; and wherein the battery exhibits a decreasing water loss over an initial twenty one day period by at least 17% when compared to a battery without the surfactant.

14. The method of claim 13 wherein the battery is at least one of: a lead acid battery, an industrial battery, an inverter battery, and a tubular inverter battery.

15. The method of claim 14 wherein the decrease of water loss of the inverter battery is during deep discharge of the battery.

16. A method for improving re-chargeability and water loss of a battery having one or more plates or electrodes comprising antimony (Sb) comprises the steps of:
  placing or providing a battery separator into a battery, wherein the battery separator includes a microporous polymer backweb with a serrated and staggered rib profile, wherein the separator includes an amount of surfactant coated thereon, wherein the amount of surfactant is in a range of 4.1 to 10.0 grams per square meter, wherein the surfactant has a hydrophile lipophile balance (HLB) value from 1 to 3, and thereby decreasing water loss over an initial twenty one day period in the battery by at least 17% when compared to a battery without the surfactant on the separator.

17. The method of claim 16 wherein the battery is selected from the group consisting of a lead acid battery, an industrial battery, an inverter battery, and a tubular inverter battery.

18. The battery according to claim 1, wherein the amount of surfactant is in the range from about 7.4 to 10.0 grams per square meter.

19. The method according to claim 13, wherein the amount of surfactant is in the range from about 7.4 to 10.0 grams per square meter.

20. The method according to claim 16, wherein the amount of surfactant is in the range from about 7.4 to 10.0 grams per square meter.

21. The battery according to claim 1, wherein the serrated and staggered rib profile is on a positive side of the microporous polymer backweb of the separator and faces a cathode of the battery.

22. The method of claim 13, wherein the battery separator is placed or provided into the battery so that the serrated and staggered rib profile is on a positive side of the microporous polymer backweb of the separator and faces a cathode of the battery.

23. The method according to claim 16, wherein the battery separator is placed or provided into the battery so that the serrated and staggered rib profile is on a positive side of the microporous polymer backweb of the separator and faces a cathode of the battery.

\* \* \* \* \*